(12) United States Patent
Pike

(10) Patent No.: US 11,188,222 B2
(45) Date of Patent: Nov. 30, 2021

(54) MULTI-ARRAYED DISPLAY USER INTERFACE PANEL

(71) Applicant: Cabin Management Solutions LLC, Conroe, TX (US)

(72) Inventor: Jeffrey Marsden Pike, The Woodlands, TX (US)

(73) Assignee: Cabin Management Solutions, LLC, Conroe, TX (US)

( * ) Notice: Subject to any disclaimer, the term of this patent is extended or adjusted under 35 U.S.C. 154(b) by 0 days.

(21) Appl. No.: 16/704,942

(22) Filed: Dec. 5, 2019

(65) Prior Publication Data

US 2021/0173554 A1 Jun. 10, 2021

(51) Int. Cl.
*G06F 3/0488* (2013.01)
*G06F 3/0481* (2013.01)

(52) U.S. Cl.
CPC ........ *G06F 3/04883* (2013.01); *G06F 3/0481* (2013.01)

(58) Field of Classification Search
CPC .. G06F 3/04883; G06F 3/0481; G06F 3/0487; G06F 1/1647
See application file for complete search history.

(56) References Cited

U.S. PATENT DOCUMENTS

| | | | |
|---|---|---|---|
| 9,141,329 B1* | 9/2015 | Reicher | G06F 3/1446 |
| 9,372,618 B2 | 6/2016 | Sirpal et al. | |
| 9,671,954 B1* | 6/2017 | Jaugilas | G06F 3/044 |
| 9,720,638 B2* | 8/2017 | Joo | G06F 3/1446 |
| 10,078,485 B2* | 9/2018 | Akatsuka | G09G 5/006 |
| 10,162,514 B2* | 12/2018 | Shapiro | G09G 5/12 |
| 10,347,140 B2* | 7/2019 | Kneuper | G06F 3/0484 |
| 10,387,100 B2* | 8/2019 | Markov | A01B 69/001 |
| 10,433,727 B2* | 10/2019 | Canda | G16H 30/00 |
| 10,592,195 B2* | 3/2020 | Kreiner | G06F 3/1446 |
| 2002/0039084 A1* | 4/2002 | Yamaguchi | A61B 6/461 345/1.1 |
| 2003/0020671 A1* | 1/2003 | Santoro | G06F 3/0481 345/1.3 |
| 2003/0119562 A1* | 6/2003 | Kokubo | H04M 1/72583 455/566 |
| 2004/0150582 A1* | 8/2004 | Dunn | G09G 3/20 345/1.3 |
| 2007/0285278 A1* | 12/2007 | Forsstrom | G08C 17/00 340/870.28 |
| 2008/0002137 A1* | 1/2008 | Kim | G02F 1/1303 349/187 |

(Continued)

*Primary Examiner* — Grant Sitta
(74) *Attorney, Agent, or Firm* — Philip Black; Dossey & Jones, PLLC

(57) ABSTRACT

An electronic computing device provides a plurality of displays unified under a single touchscreen module. The device includes a casing for housing device components and a processor operable to control the functionality of the device. A graphical user interface may be stored on the processor to provide interactive elements and an environment for a device user.

A glass substrate layer defining a top surface of the device is positioned adjacent a touchscreen module in operable communication with the processor. Below the touchscreen module, a plurality of displays may be positioned adjacent the touchscreen module and are each in operable communication with the processor to display a screen. With this configuration, multiple programs may be seamlessly run within one device.

4 Claims, 13 Drawing Sheets

(56) References Cited

U.S. PATENT DOCUMENTS

| | | | |
|---|---|---|---|
| 2008/0007481 A1* | 1/2008 | Chen | G06F 3/147 345/1.1 |
| 2008/0165082 A1* | 7/2008 | Manico | G06F 3/1446 345/1.3 |
| 2009/0040134 A1* | 2/2009 | Jang | G06F 1/1647 345/1.1 |
| 2009/0046033 A1* | 2/2009 | Siegel | G06F 3/1431 345/1.3 |
| 2009/0096711 A1* | 4/2009 | Jang | G06F 3/1446 345/1.3 |
| 2009/0112380 A1* | 4/2009 | Nutaro | G06F 3/1438 701/14 |
| 2009/0153436 A1* | 6/2009 | Ju | G09F 9/35 345/1.3 |
| 2009/0256780 A1* | 10/2009 | Small | H04N 1/00127 345/55 |
| 2010/0066698 A1* | 3/2010 | Seo | G06F 3/04883 345/173 |
| 2010/0211237 A1* | 8/2010 | Nichols | G08G 5/0021 701/14 |
| 2010/0259375 A1* | 10/2010 | Ferren | G06F 3/04847 340/462 |
| 2010/0271546 A1* | 10/2010 | Stalaw | H04N 21/4858 348/468 |
| 2011/0095990 A1* | 4/2011 | Philipp | G06F 3/0445 345/173 |
| 2011/0102198 A1* | 5/2011 | Deleris | B64D 43/00 340/971 |
| 2011/0166748 A1* | 7/2011 | Schneider | G06F 17/00 701/36 |
| 2011/0241901 A1* | 10/2011 | Firra | G01C 23/00 340/974 |
| 2011/0273819 A1* | 11/2011 | Sokola | G06F 1/1656 361/679.01 |
| 2012/0054143 A1* | 3/2012 | Doig | G06Q 30/0269 706/47 |
| 2012/0256862 A1* | 10/2012 | Wagner | G06F 3/048 345/173 |
| 2013/0063970 A1* | 3/2013 | Oh | G02B 6/0036 362/604 |
| 2013/0076540 A1* | 3/2013 | McLoughlin | G08G 5/0021 340/945 |
| 2013/0120304 A1* | 5/2013 | Miyahara | G06F 3/0481 345/173 |
| 2013/0234841 A1 | 9/2013 | Galipeau et al. | |
| 2013/0329460 A1* | 12/2013 | Mathew | H05K 5/02 362/612 |
| 2014/0035855 A1* | 2/2014 | Feldman | G06F 3/0488 345/173 |
| 2014/0073412 A1* | 3/2014 | Kovacs | G07F 17/3211 463/25 |
| 2014/0074323 A1* | 3/2014 | Andre | G08G 5/0039 701/3 |
| 2014/0232665 A1* | 8/2014 | Lee | G06F 3/0412 345/173 |
| 2014/0300555 A1* | 10/2014 | Rogers | G06F 3/0482 345/173 |
| 2015/0094910 A1* | 4/2015 | Bassier | G06F 3/0416 701/41 |
| 2015/0266272 A1* | 9/2015 | Lee | B32B 37/1284 428/189 |
| 2015/0352952 A1* | 12/2015 | Kneuper | G08G 5/0052 701/36 |
| 2015/0355729 A1* | 12/2015 | Park | G09G 5/003 345/173 |
| 2016/0082359 A1* | 3/2016 | Thompson | A63F 13/90 463/46 |
| 2016/0162242 A1* | 6/2016 | Xiong | G06F 3/1431 345/5 |
| 2016/0179327 A1* | 6/2016 | Zammit-Mangion | G08G 5/0039 701/7 |
| 2016/0228091 A1* | 8/2016 | Chiang | A61B 8/467 |
| 2017/0061882 A1* | 3/2017 | An | G09G 3/3266 |
| 2017/0197145 A1* | 7/2017 | Bellinghausen | G06F 3/0354 |
| 2017/0295648 A1* | 10/2017 | Ohashi | G09F 9/30 |
| 2018/0101350 A1* | 4/2018 | Nonaka | G06F 3/1423 |
| 2018/0182281 A1* | 6/2018 | Charrad | A61B 6/502 |
| 2018/0213135 A1* | 7/2018 | Joao | G01C 21/3679 |
| 2018/0329572 A1* | 11/2018 | Gupta | G06F 3/1446 |
| 2019/0004637 A1* | 1/2019 | Bani | G06F 3/044 |
| 2019/0253698 A1* | 8/2019 | O'Driscoll | H04N 13/395 |

* cited by examiner

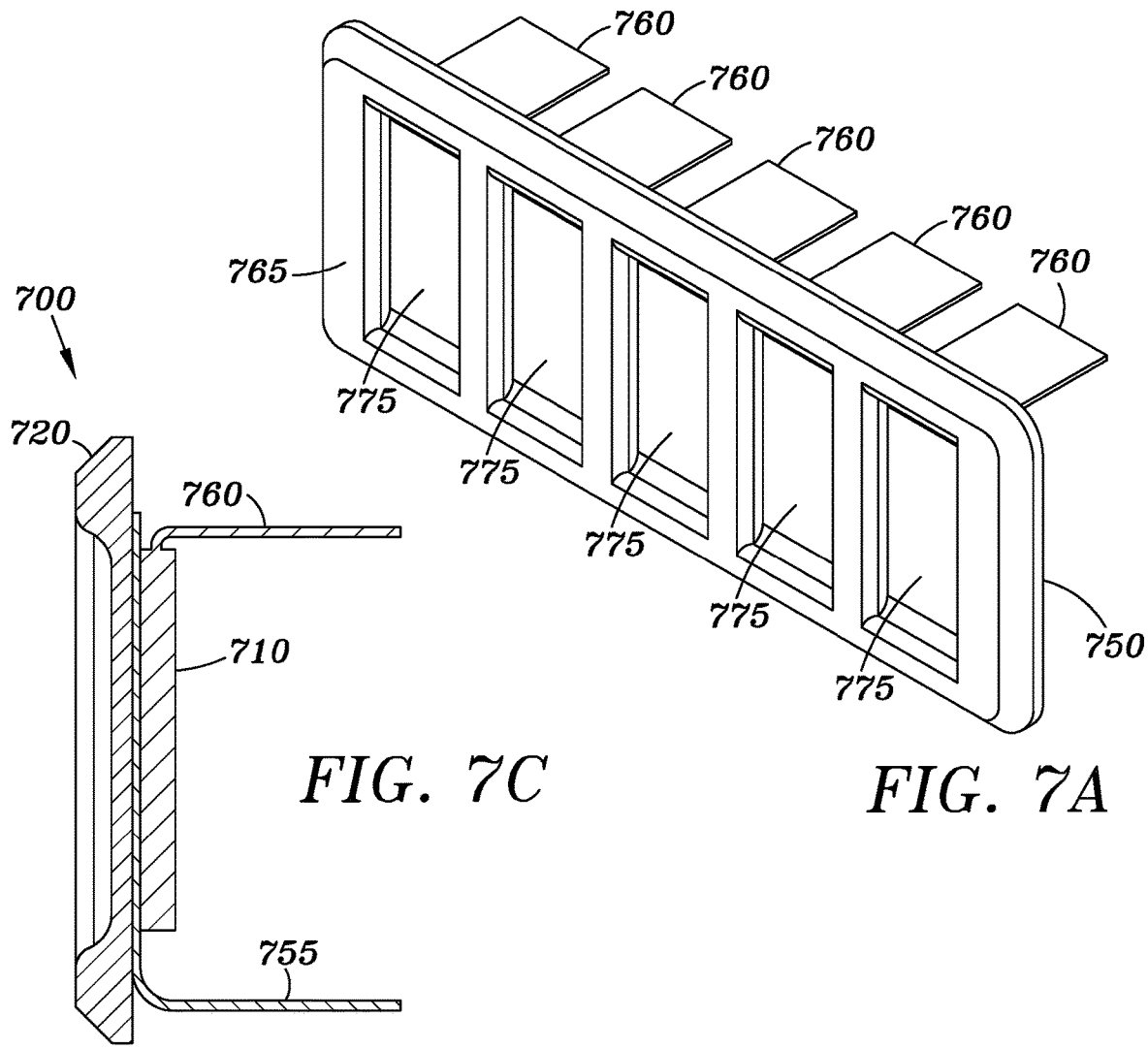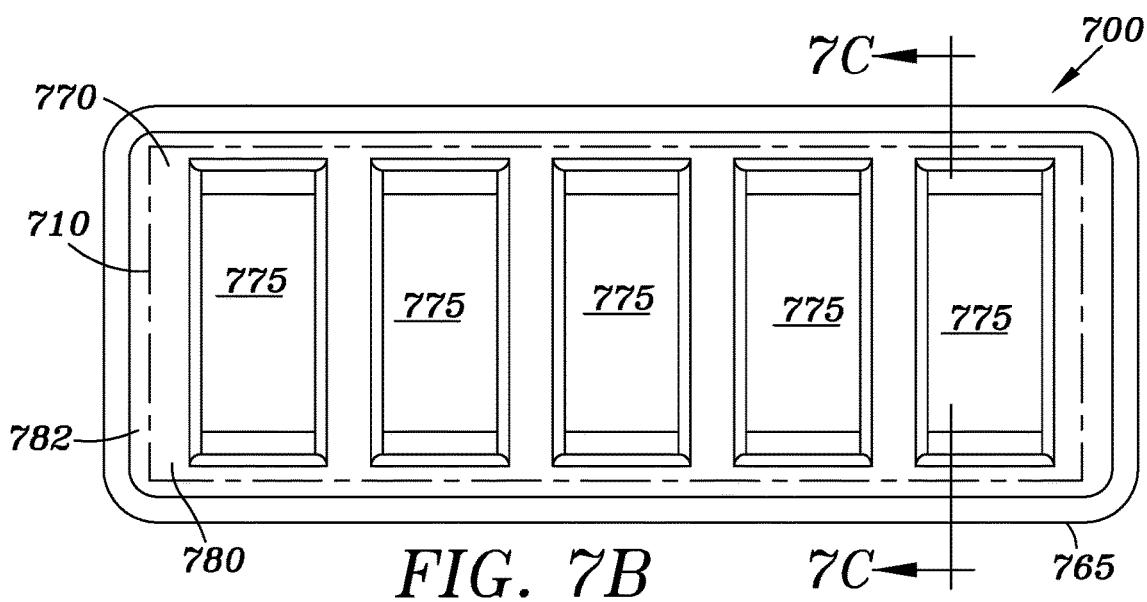

MULTI-ARRAYED DISPLAY USER INTERFACE PANEL

FIELD OF THE INVENTION

The disclosure relates generally to touchscreen interfaces, and more specifically to a touchscreen interface including multiple displays positioned within a single device.

BACKGROUND OF THE INVENTION

A large percentage of electronic devices today include a touchscreen display. Devices are typically either equipped with a touchscreen and a physical keyboard (such as a laptop) or with a single display and touchscreen interface. Both configurations have their advantages and drawbacks.

Manual input devices may be useful in conjunction with a touchscreen electronic device. Not only do they reduce the burden on the processor, but they can allow for efficiency of data input in specific instances. However, manual input devices (such as keyboards) take up space on an electronic device, reducing potential functionality if that space were to be used for other more efficient/useful components.

Many electronic devices today make use of a touchscreen display interface. This specific type of setup allows for users to perform tactile movements while the device translates the movements into functions for the electronic device to perform. In many models, a touchscreen interface may provide multiple functional screens to be displayed on a single display, making multitasking for a user of the touchscreen interface much easier.

Inefficient operating systems which cannot necessarily run more complex programs properly while also translating and carrying out tactile movement instructions can be burdensome on the power supply of the device as well as provide subpar usability experience for a user. Often times, this may lead to screen freezing or malfunctioning. Depending on the operating system and programs being run, it may be necessary to employ multiple electronic devices in order to be able to run certain programs efficiently.

BRIEF SUMMARY OF THE INVENTION

The disclosed subject matter provides a touchscreen electronic device including multiple displays positioned adjacent a single touchscreen module. The electronic device comprises a casing for housing device components and a processor operable to control the functionality of the device. A graphical user interface may be run by the processor to provide interactive elements and an environment for a device user. A glass substrate layer defining a top surface of the device is positioned adjacent a touchscreen module in operable communication with the processor. Below the touchscreen module, a plurality of displays may be positioned adjacent the touchscreen module and are each in operable communication with the processor to display a screen, denoted as the viewable screen section. With this configuration, multiple programs may be seamlessly run within one device. In certain configurations of the touchscreen electronic device, the plurality of displays may be more or less spaced apart from one another based on the number of displays incorporated into the touchscreen electronic device. Additionally, the device itself may comprises multiple configurations, such as including a curved screen as well as having a non planar touch surface that may include characteristics such as, but not limited to, texture, sweeping curves, pocketed areas, and raised protrusions.

In another embodiment, the electronic device may comprise one or more components and/or graphics positioned in between the displays. Components may include, but are not limited to, auxiliary devices (including audio jacks, data ports, power ports, and photo sensors), antennas, and printed/etched graphics. The components/graphics may provide a number of functionalities/purposes such as, but not limited to, photograph capture, audio output, data transfer, charging capability, network signal reception/transmission, and branding.

In yet another embodiment, at least one of the touchscreen module, the substrate layer, the plurality of displays, and the viewable screen section may comprise multiple configurations (shapes/sizes). Any of the plurality of displays may comprise a specific size and/or shape in order to either match a specific size and/or shape of the viewable screen section associated with the displays or to properly run a specific application or program that runs better when a display is configured a certain way. The touchscreen module and/or substrate layer may comprise a specific size or shape while the plurality of displays within the electronic computing device is positioned based on the specific size or shape.

In yet another embodiment, an electronic computing device may be capable of receiving gesture input through an interactive module. When an application is run on interactive module, a first screen may be displayed on one of the plurality of screens. A second screen 1198 may also be displayed on another of the plurality of screens when the same or another application is run on the interactive module. If a user of the electronic computing device wants to move the first screen to the position of the second screen, the user may perform a gesture input. During the gesture input process, gesture sensors in operable communication with a processor are operable to receive, analyze, and translate the gesture input as an input used to move a first element associated with a first display to a second position in a second display, while also replacing a second element in the second display with the first element. As a result of the gesture input, first screen becomes positioned where second screen was positioned and a third screen is positioned where the first screen was positioned.

BRIEF DESCRIPTION OF THE DRAWINGS

The disclosed subject matter, objectives, and advantages thereof, will best be understood by reference to the following detailed description of an illustrative embodiment when read in conjunction with the accompanying drawings, wherein:

FIG. 7A displays a perspective view of a seventh embodiment of visual and tactile components of an electronic computing device having a non planar surface.

FIG. 7B displays a front view of a seventh embodiment of visual and tactile components of an electronic computing device having a non planar surface.

FIG. 7C displays a cross-sectional view of a seventh embodiment of visual and tactile components of an electronic computing device having a non planar surface.

DETAILED DESCRIPTION

Reference now should be made to the drawings, in which the same reference numbers are used throughout the different figures to designate the same components.

It will be understood that, although the terms first, second, third, etc. may be used herein to describe various elements, these elements should not be limited by these terms. These terms are only used to distinguish one element from another element. Thus, a first element discussed below could be termed a second element without departing from the teachings of the present disclosure.

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises" and/or "comprising" or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Figure 1A:
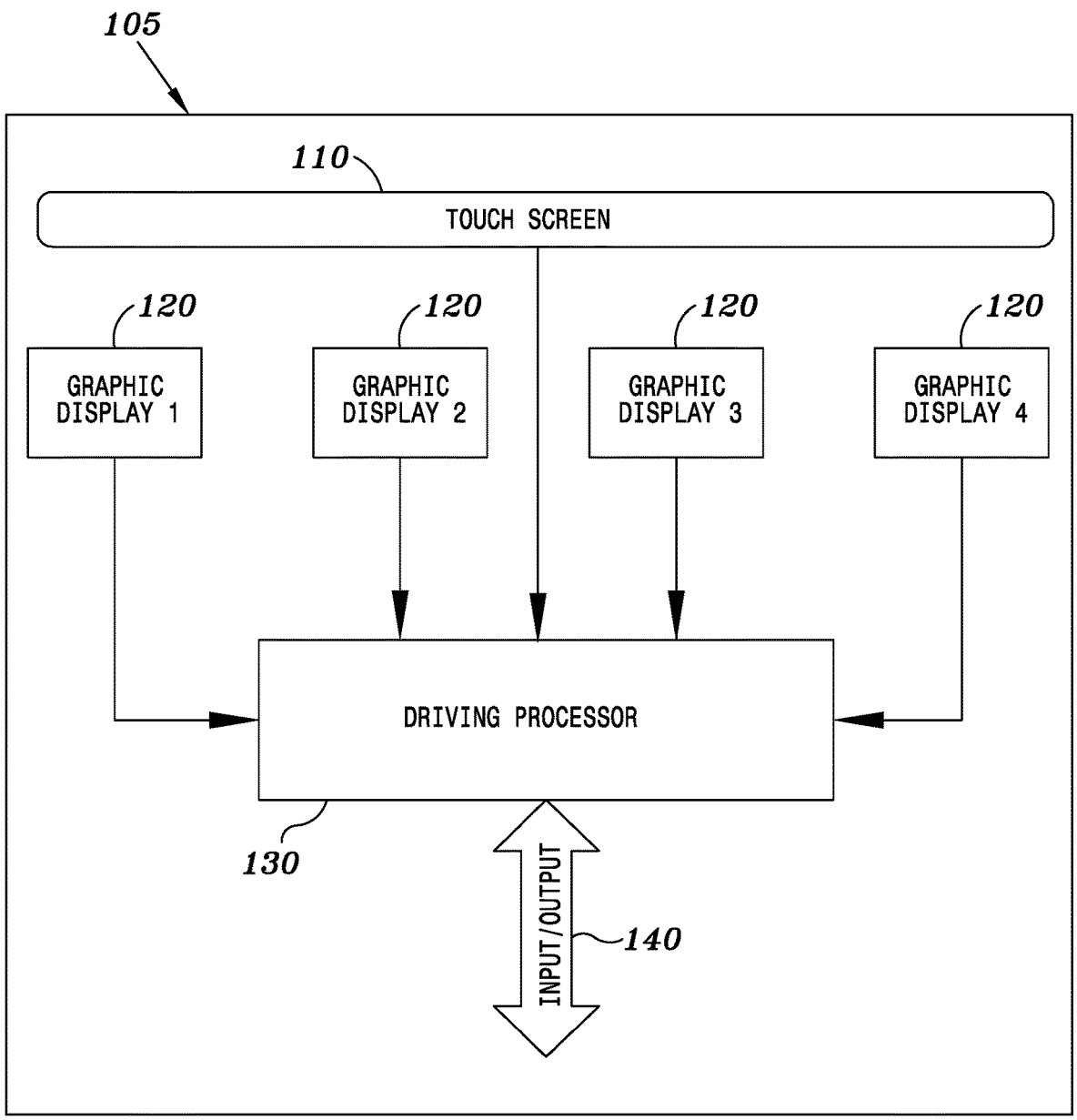
FIG. 1A displays a schematic view of a first embodiment of an electronic computing device having multiple displays.

FIG. 1A displays a schematic view of a first embodiment 100 of an electronic computing device 105 having multiple displays 120. The electronic computing device 105 may comprise a plurality of displays (four are shown and are depicted as GRAPHIC DISPLAY 1, GRAPHIC DISPLAY 2, GRAPHIC DISPLAY 3, and GRAPHIC DISPLAY 4) in operable communication with a processor 130 (depicted as DRIVING PROCESSOR) and are unified under a single touchscreen module 110. Processor 130 is not limited to a specific configuration and may include a specialized communications processor, a digital signal processor, and/or a general-purpose processor. Touchscreen module 110 (depicted as TOUCH SCREEN) is also connected to processor 130 and provides a tactile interface for the reception of input by a user. It is noted that electronic computing device 105 and other alternatives or embodiments disclosed in any of the figures in this disclosure may include two displays, three displays, four displays, or more than four displays. The plurality of displays are capable of receiving and displaying elements of an operating system or graphical user interface (GUI) in the form of screens that are sent through processor 130 to the plurality of displays 120 via input/output 140 (depicted as INPUT/OUTPUT). Each of the plurality of displays 120 includes an integrated back light (not depicted) to project screens from the plurality of displays 120 for viewing purposes. Incorporating the plurality of displays 120 in a single electronic computing device 105 may provide better functionality for an end user. If a specific situation or environment calls for the electronic computing device 105 to perform multiple complicated functions within multiple programs or applications, the plurality of displays 120 may allow for the multiple programs or applications to execute and provide an output in the form of screens 185 on the plurality of displays 120 without the need of multiple electronic computing devices each having a single display.

Figure 1B:
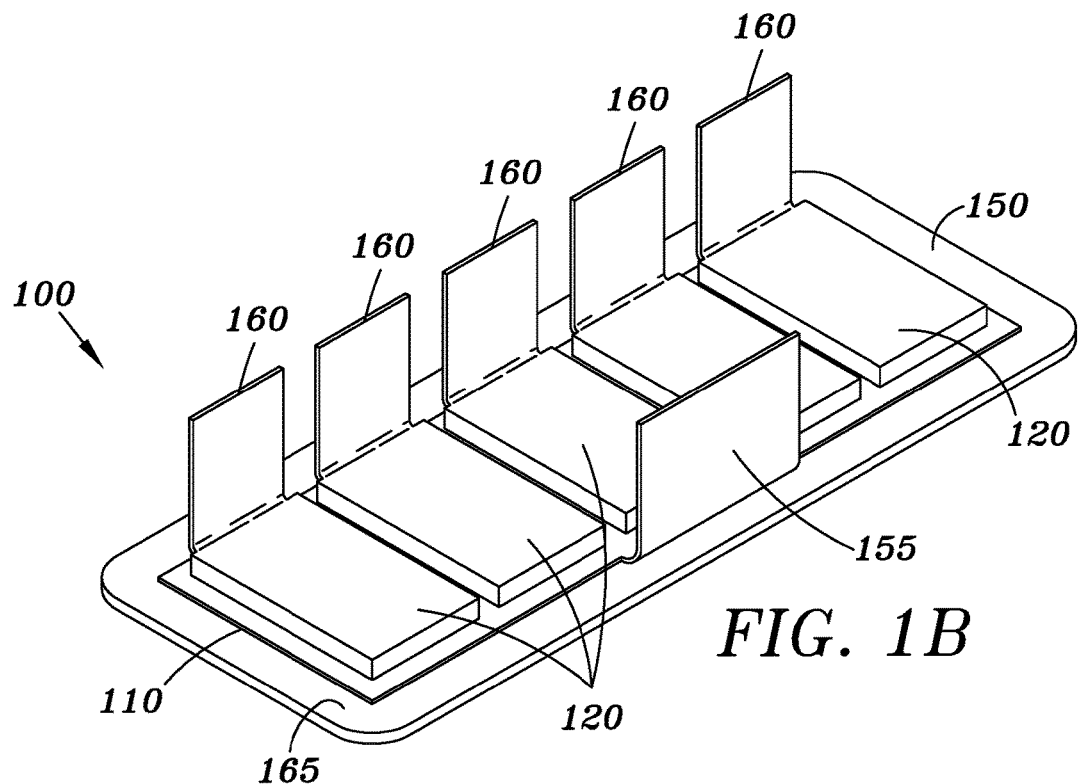
FIG. 1B displays a perspective view of a first embodiment of visual and tactile components of an electronic computing device having multiple displays.

FIG. 1B displays a perspective view of a first embodiment 100 of visual and tactile components of an electronic computing device 105 having multiple displays 120. First embodiment 100 may include a glass substrate layer 150 defining a top surface 165 of electronic computing device 105. Touchscreen module 110 is positioned adjacent glass substrate layer 150 and includes a flexible circuit tail 155 for wired connection with a board (such as a motherboard, a mainboard, etc.). Glass substrate layer 150 may act as a barrier to protect internal components of electronic computing device 105 and may also provide a sturdy input interface for a user of electronic computing device 105. Top surface 165 may refer to an exposed face of first embodiment 100 facing a user and may be the first portion of first embodiment 100 to receive a user input.

For any embodiment disclosed herein, what is referred to herein as the "glass substrate layer" or "substrate layer" may actually be made of a material other than glass; more particularly the substrate layer be comprised of any suitable rigid or semi-rigid transparent material (i.e. glass or plastic). Generally, the substrate layer can provide the structure for the overall touchscreen and display assembly. The substrate layer can vary in thickness to function properly with the applied touch sensor. If the desired aesthetic appearance of the substrate requires thicker or thinner material, then the area inside the active portions of the gesture sensor can be pocketed or raised to achieve the required thickness for proper functionality. The front surface of an embodiment may be flat, rounded or have an asymmetrical surface when compared to the opposite side where the touch sensor is applied. It may also have rounded or chamfered corners and edges to achieve a desired asthenic look. Due to the transparent nature of the substrate layer, it is possible to add edge lighting which will illuminate the material or any graphics or characters etched in to the outside surfaces. Ink printing can be applied to any surface to block out desired areas or as a means for adding graphics and characters, which could also be illuminated if a lighting source was applied. The substrate layer may also contain holes that allow peripheral devises to pass through, a head phone jack or status light for example.

A plurality of displays 120 is positioned adjacent (below) and in operating communication with touchscreen module 110. The displays also include a flexible circuit tail 160 for connection with a board. Each of the displays 120 may lie in a single plane and may be spaced a certain distance apart from one another so that each of the displays 120 operates with its own displayable content decided upon via input from touchscreen module 110.

Figure 1C:
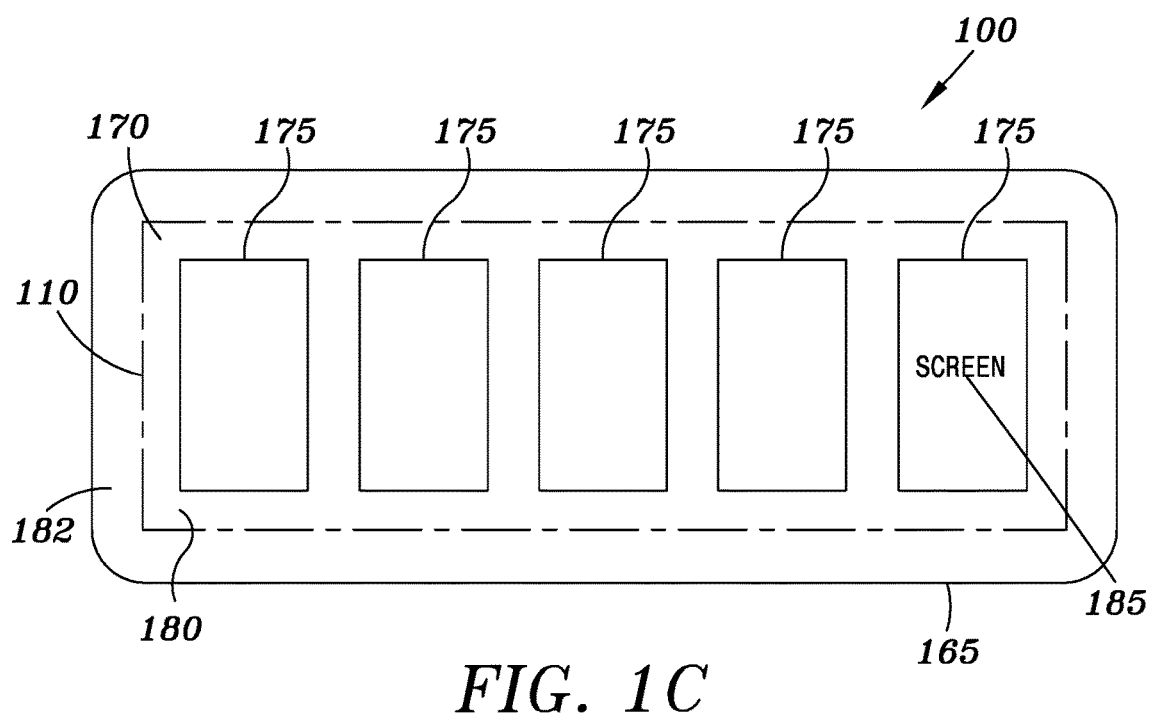
FIG. 1C displays a front view of a first embodiment of visual and tactile components of an electronic computing device having multiple displays.

FIG. 1C displays a front view of a first embodiment 100 of visual and tactile components of an electronic computing device 105 having multiple displays 120. First embodiment 100 includes a plurality of displays 120 collectively define a viewable screen section 175 where separate content may be run on each of the displays 120. Touchscreen module 110 (defined as a dotted line in FIG. 1C) may define an interactive section 170 where a user may provide input to touchscreen module 110 in the form of tactile movements. It is noted that tactile movements may be recognized and processed in any portion of interactive section 170, meaning that the tactile movement may be recognizable in a portion of interactive section 170 overlapping viewable screen section 175 and not overlapping viewable screen section 175. This setup and functionality may allow for tactile movements to "carry over" engageable elements from one display 120 to another display 120. For example, engaging screen 185 with a tactile engagement and movement over another display 120 may displace screen 185 from a first display 120 to a second display 120 (screen 185 moved from its shown position in FIG. 1C to an adjacent display 120). For the purposes of this disclosure, the term "viewable screen section" 175 may collectively refer to all sections of first embodiment 100 capable of displaying a screen 185.

In order to more easily define viewable screen section 175, in embodiments, glass substrate layer 150 may be back painted with one or more colors of paint. The painted portions of glass substrate layer 150 may correspond to the portion of the interactive section 170 that does not overlap viewable screen section 175. It is noted that non-viewable section 180 may be covered by portions of back painted glass substrate layer 150 and are still capable of receiving input from a user. Portions of the glass substrate layer 150 that are back-painted but do not overlap touchscreen module 110 makes up the non-interactive section 182 of first embodiment 100. This section may not provide interactive functionality but may function as an aesthetic boundary for the interactive section 170 and viewable screen section 175. In embodiments, each of the plurality of displays 120 may be setup right next to the other so that there is no space in between each display 120. It is noted that the back painted surface comprises a color substantially the same as the plurality of displays 120 when the plurality of displays 120 are inoperative (for aesthetic purposes).

It is noted that, in embodiments, the structure of first embodiment 100 may be structurally stable and not physically manipulatable (foldable, bendable, etc.), including between displays 120. These sturdy areas between displays 120 may be denoted as uninterruptible transition zones 189 and may resist manipulation so that displays 120 stay positioned in a single plane.

In embodiments, glass substrate layer 150 may be a functional portion of touchscreen module 110 and input from a user may be received and analyzed by both glass substrate layer 150 and touchscreen module 110. In order to accomplish this functionality, glass substrate layer 150 may include, but is not limited to, gesture sensors, a portion of a resistive circuit, films, and conductive coatings. This may be true for one or more embodiments mentioned in this disclosure. Either the touchscreen module 110 or the touchscreen module 110 in combination with glass substrate layer 150 may be embedded with one or more types of touchscreen technology including, but not limited to, resistive touch, surface capacitive, projected capacitive, saw touch, and infrared (IR) touch.

A plurality of additional features and feature refinements are applicable to specific embodiments. These additional features and feature refinements may be used individually or in any combination. It is noted that each of the following features discussed may be, but are not necessary to be, used with any other feature or combination of features of any of the embodiments presented herein.

Figure 2A:
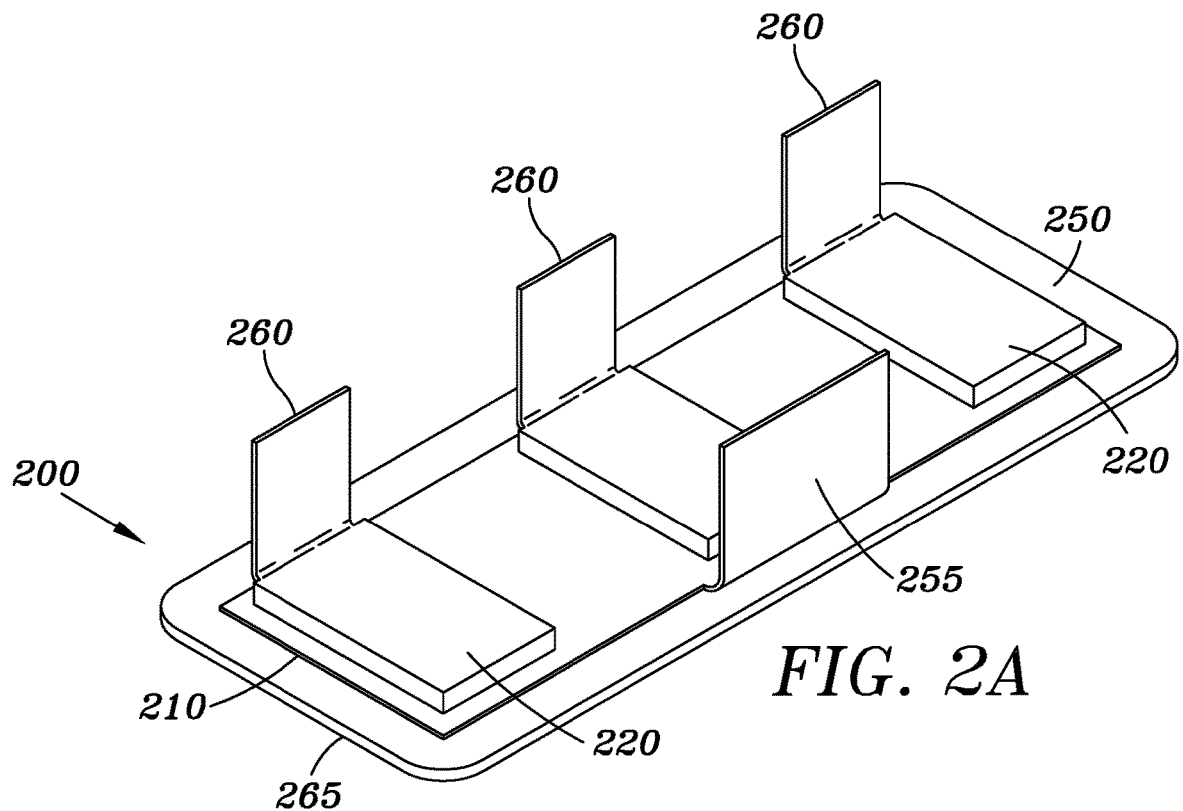
FIG. 2A displays a perspective view of a second embodiment of visual and tactile components of an electronic computing device having spaced-out displays.
Figure 2B:
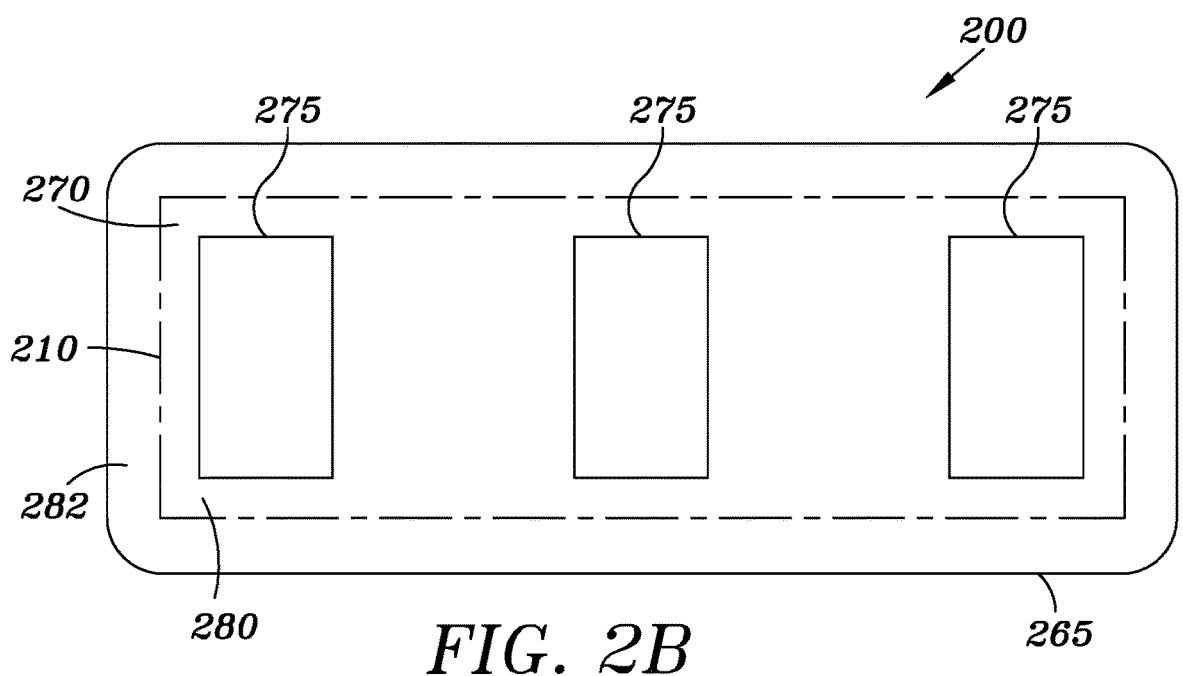
FIG. 2B displays a front view of a second embodiment of visual and tactile components of an electronic computing device having multiple displays.

FIG. 2A displays a perspective view of a second embodiment 200 of visual and tactile components of an electronic computing 105 device having spaced-out displays 220. Similar to the first embodiment 100, this embodiment 200 includes a touchscreen module 210, a plurality of displays 220, a glass substrate layer 250, a flexible circuit tail (of the touchscreen module 210) 255, a flexible circuit tail (of the plurality of displays 220) 260, a top surface 265, an interactive section 270, a viewable screen section 275, a non-viewable section 280, and a non-interactive section 282. It is noted that the similar reference numbers refer to elements similar to those found in first embodiment 100. Second embodiment 200, as shown in FIG. 2B, may include viewable screen section 275 including sections defined by displays 220 that are more spaced apart than the displays 120 found in FIGS. 1B and 1C. Spacing out displays 220 may reduce visual cluttering associated with the running and execution of multiple screens on multiple displays 220. Interactive section 210, in second embodiment 200, may also overlap displays 220 and the space in between the displays 220 (similar to first embodiment 100), allowing for tactile movement of engageable objects from a first display 220 to a second display 220.

Figure 3A:
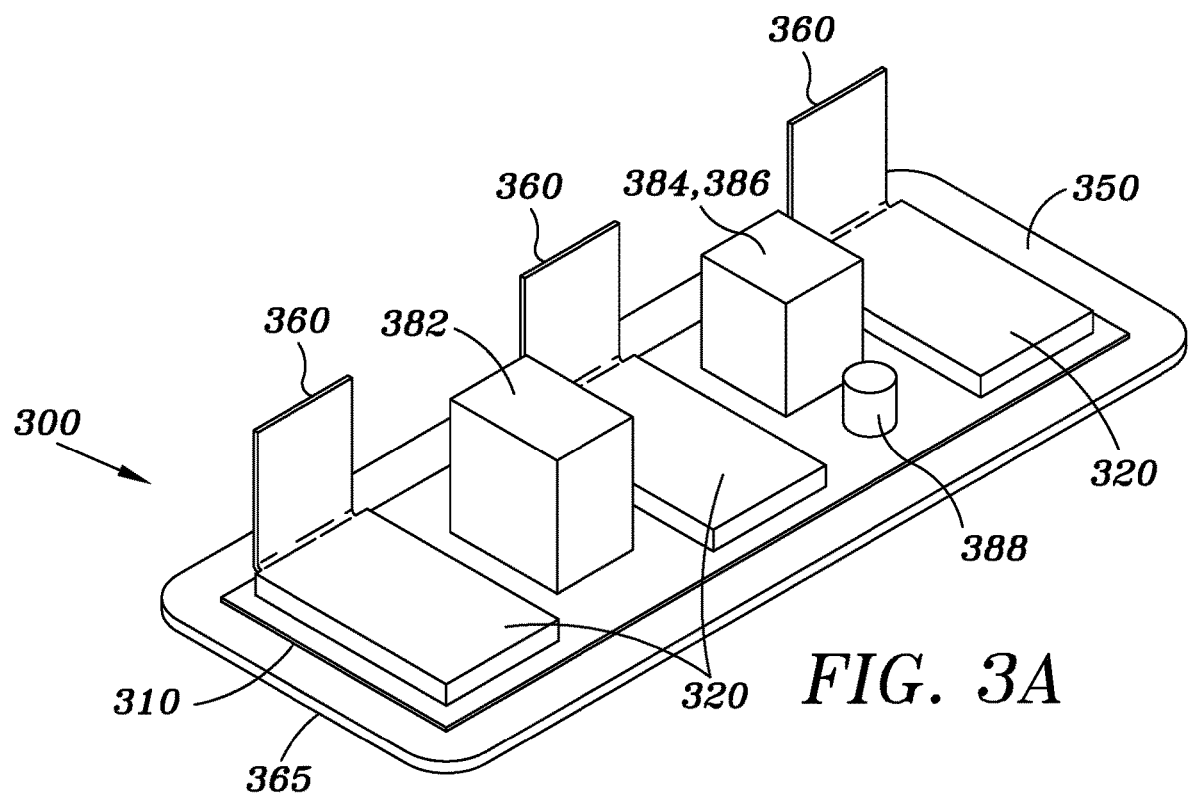
FIG. 3A displays a perspective view of a third embodiment of visual and tactile components of an electronic computing device having auxiliary components.
Figure 3B:
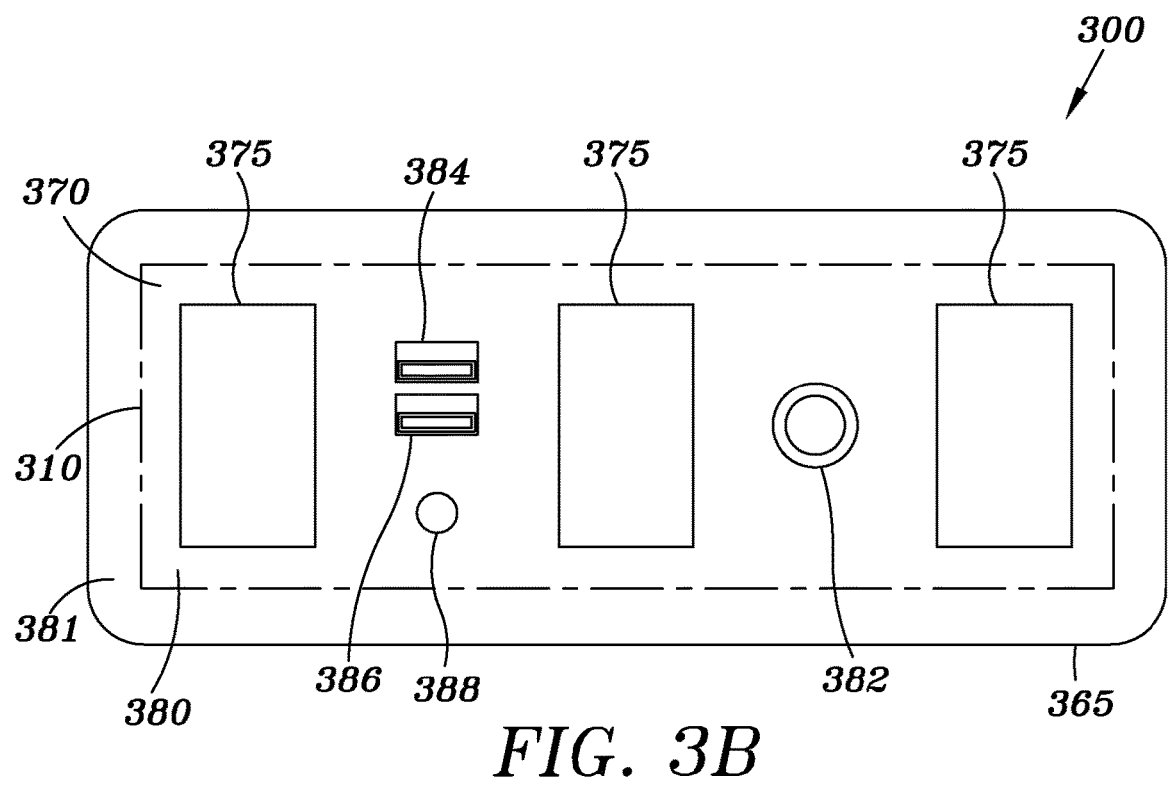
FIG. 3B displays a front view of a third embodiment of visual and tactile components of an electronic computing device having auxiliary components.

FIG. 3A displays a perspective view of a third embodiment 300 of visual and tactile components of an electronic computing device 105 having auxiliary components 382, 384,386,388. Similar to the first embodiment 100, this embodiment 300 includes a touchscreen module 310, a plurality of displays 320, a glass substrate layer 350, a flexible circuit tail (of the touchscreen module 310) 355, a flexible circuit tail (of the plurality of displays 320) 360, a top surface 365, an interactive section 370, a viewable screen section 375, a non-viewable section 380, and a non-interactive section 381. It is noted that the similar reference numbers refer to elements similar to those found in first embodiment 100. Similar to the second embodiment, the third embodiment 300 comprises spaced-out displays 320. The space between displays 320 may be utilized for positioning one or more auxiliary components 382,384,386, 388. Auxiliary components positioned adjacent the plurality of displays 320 may include audio jack 382, data port 384, power port, and photo sensor 388. Each of the auxiliary components 382,384,386,388 may provide one or more functions to third embodiment 300 of electronic computing device 105 such as, but not limited to, photograph capture, audio output, data transfer, and charging capability. As shown in FIG. 3B, auxiliary components 382,384,386,388 may be positioned between displays 320 in order to not overlap the viewable screen sections 375 and provide convenient functionality for a user within the top surface 365 of third embodiment 300. For proper functionality, each of the auxiliary components 382,384,386,388 may be positioned and affixed within orifices created in touchscreen module 310 and glass substrate layer 350.

Figure 4A:
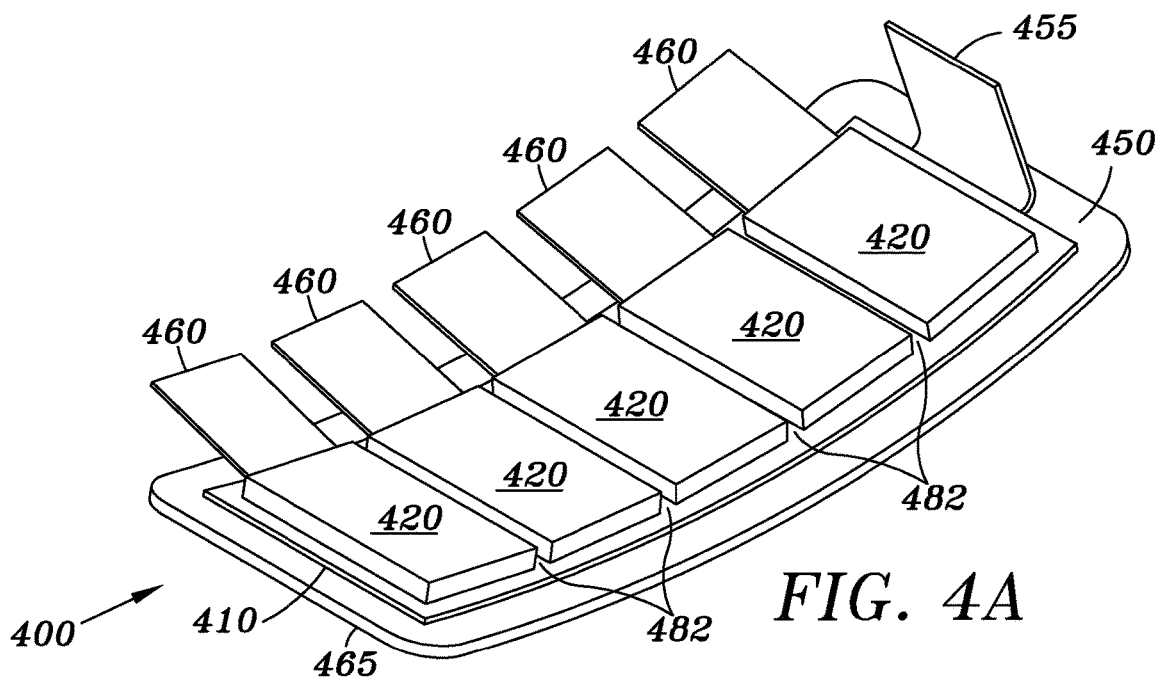
FIG. 4A displays a perspective view of a fourth embodiment of visual and tactile components of an electronic computing device having a curved touchscreen module.
Figure 4B:
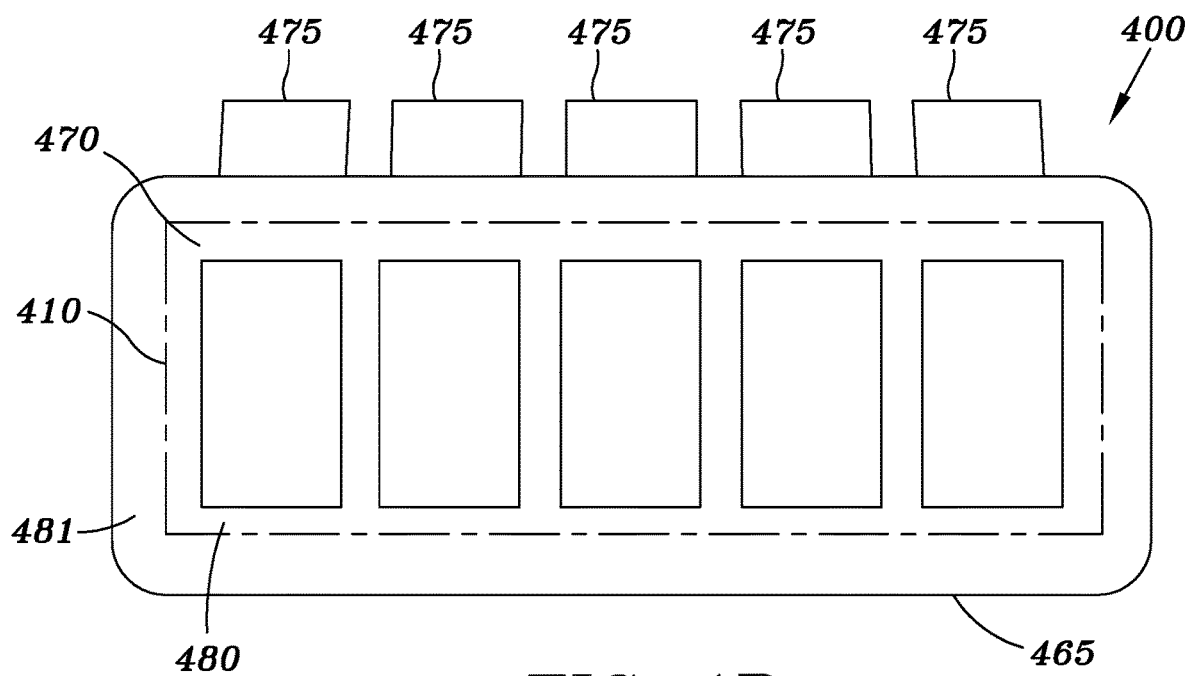
FIG. 4B displays a front view of a fourth embodiment of visual and tactile components of an electronic computing device having a curved touchscreen module.

FIGS. 4A and 4B display perspective and front views of a fourth embodiment 400 of visual and tactile components of an electronic computing device 105 having a curved touchscreen module 410. Similar to the first embodiment 100, this embodiment 400 includes a touchscreen module 410, a plurality of displays 420, a glass substrate layer 450, a flexible circuit tail (of the touchscreen module 410) 455, a flexible circuit tail (of the plurality of displays 420) 460, a top surface 465, an interactive section 470, a viewable screen section 475, a non-viewable section 480, and a non-interactive section 481. It is noted that the similar reference numbers refer to elements similar to those found in first embodiment 100. Fourth embodiment 400 may comprise a touchscreen module 410 and a glass substrate layer 450 that are curved. For this configuration, each of the plurality of displays 420 are spaced apart so that gaps 482 are positioned in between each display 420. This keeps the displays 420 from contacting one another due to the curve of the touchscreen module 410 and the glass substrate layer 450. It is noted that the flexible circuit tail 455 of touchscreen module 410 may be positioned at a short end of the touchscreen module since the short end of the touchscreen module 410 is not curved. The curved nature of the touchscreen module 410 and the glass substrate layer 450 may provide additional functionality to electronic computing device 105 and may be used in situations such as, but not limited to, advertising.

Figure 5A:
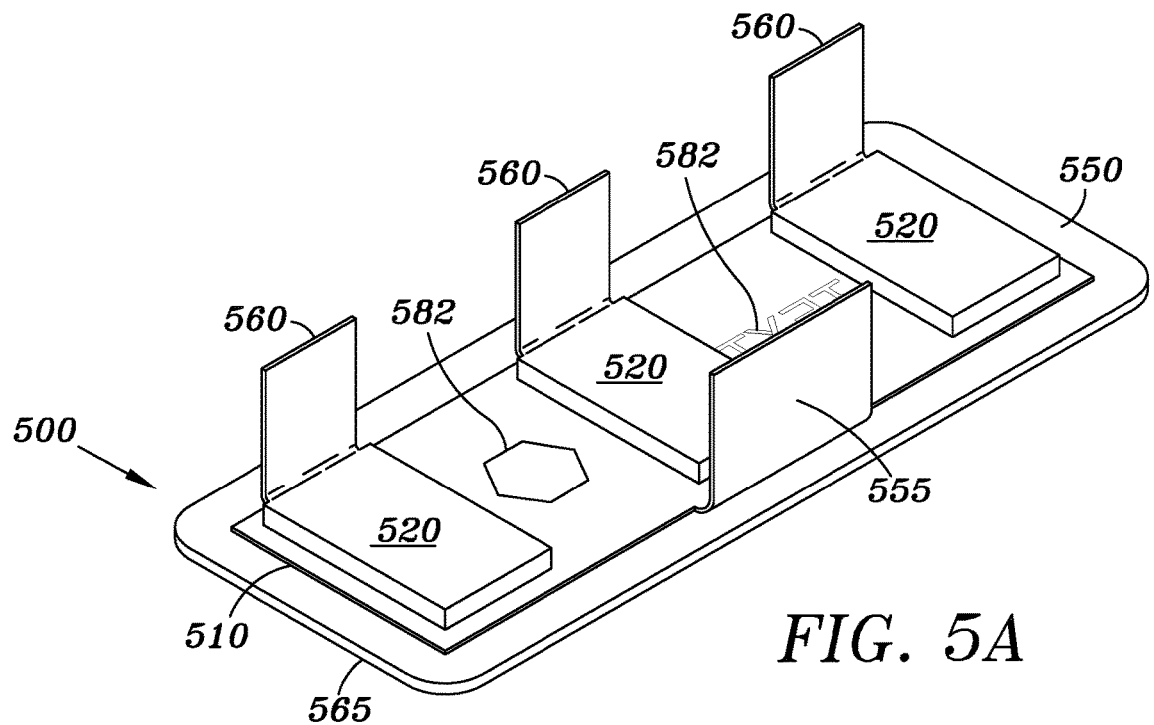
FIG. 5A displays a perspective view of a fifth embodiment of visual and tactile components of an electronic computing device having printed graphics.
Figure 5B:
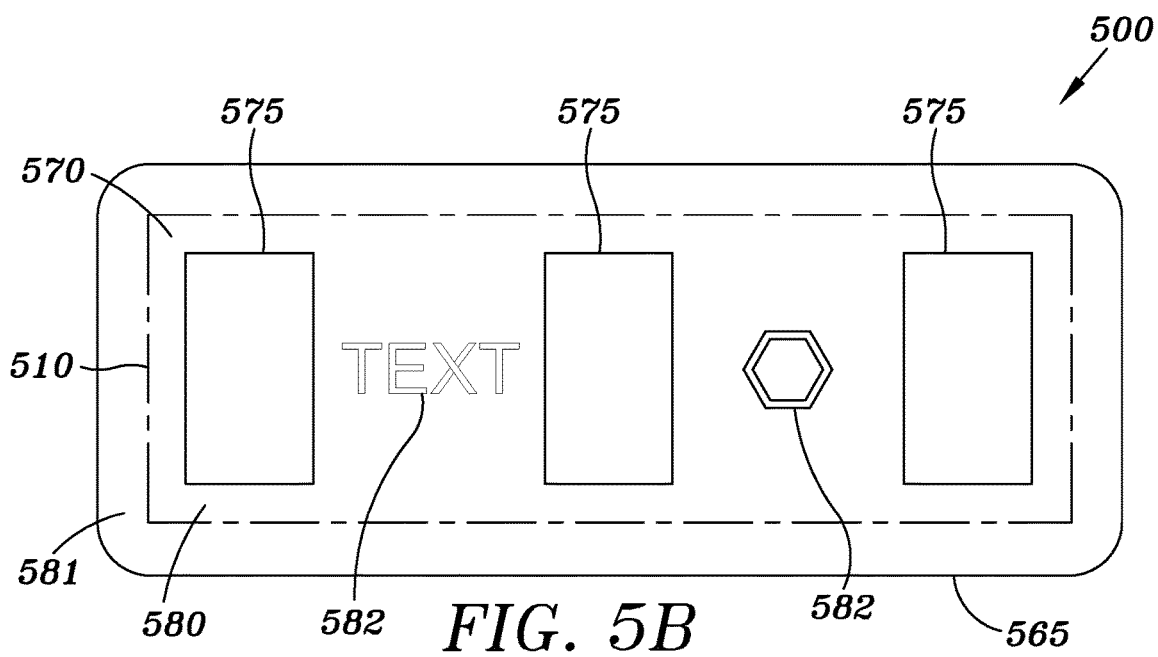
FIG. 5B displays a front view of a fifth embodiment of visual and tactile components of an electronic computing device having printed graphics.

FIG. 5A displays a perspective view of a fifth embodiment 500 of visual and tactile components of an electronic computing device 105 having printed graphics 582. Similar to the first embodiment 100, this embodiment 500 includes a touchscreen module 510, a plurality of displays 520, a glass substrate layer 550, a flexible circuit tail (of the touchscreen module 510) 555, a flexible circuit tail (of the plurality of displays 520) 560, a top surface 565, an interactive section 570, a viewable screen section 575, a non-viewable section 580, and a non-interactive section 581. It is noted that the similar reference numbers refer to elements similar to those found in first embodiment 100. Fifth embodiment 500 comprises printed graphics 582 in the form of text and shapes. This may allow for the electronic computing device to be more customized (for branding purposes, etc.). Graphics 582 may either be imprinted onto top surface 565 (see FIG. 5B) or may be back printed on the back surface of glass substrate layer 550 (see FIG. 5A). In an embodiment where the glass substrate layer 550 is back printed with another color, the printing process may either leave room for the graphics 582 to be printed, or the graphics 582 and the other back printing color may be printed onto the glass substrate layer 550 at the same time.

Figure 6A:
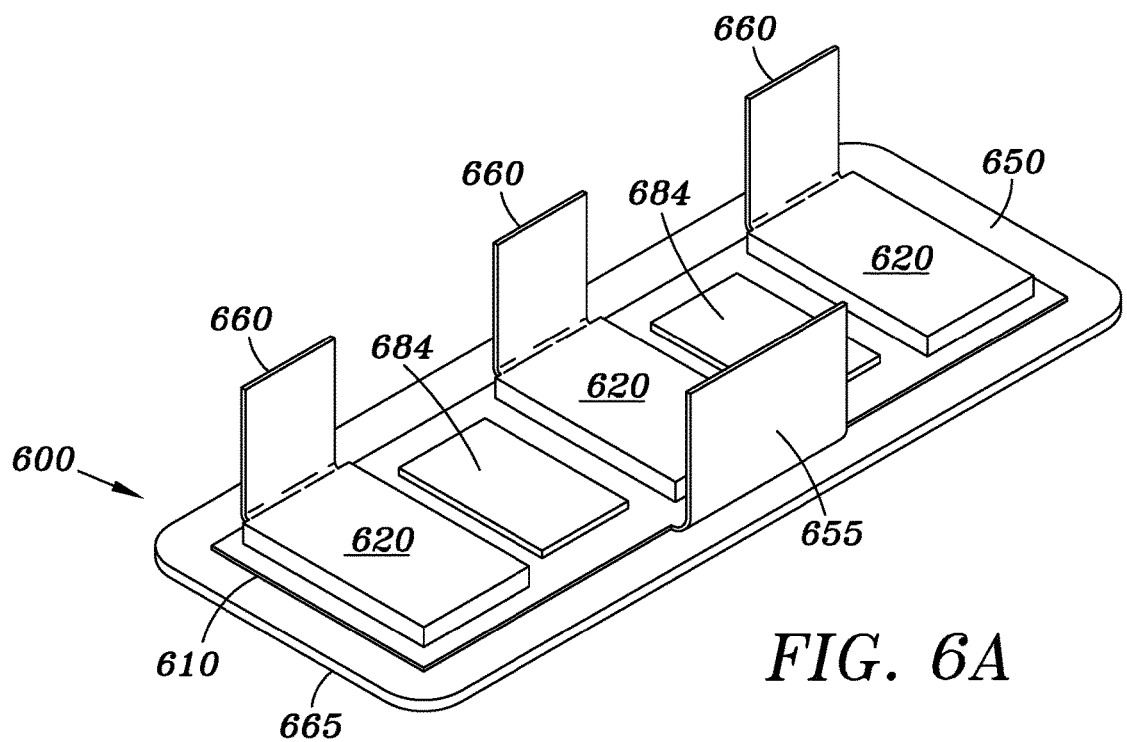
FIG. 6A displays a perspective view of a sixth embodiment of visual and tactile components of an electronic computing device having backlit graphics.
Figure 6B:
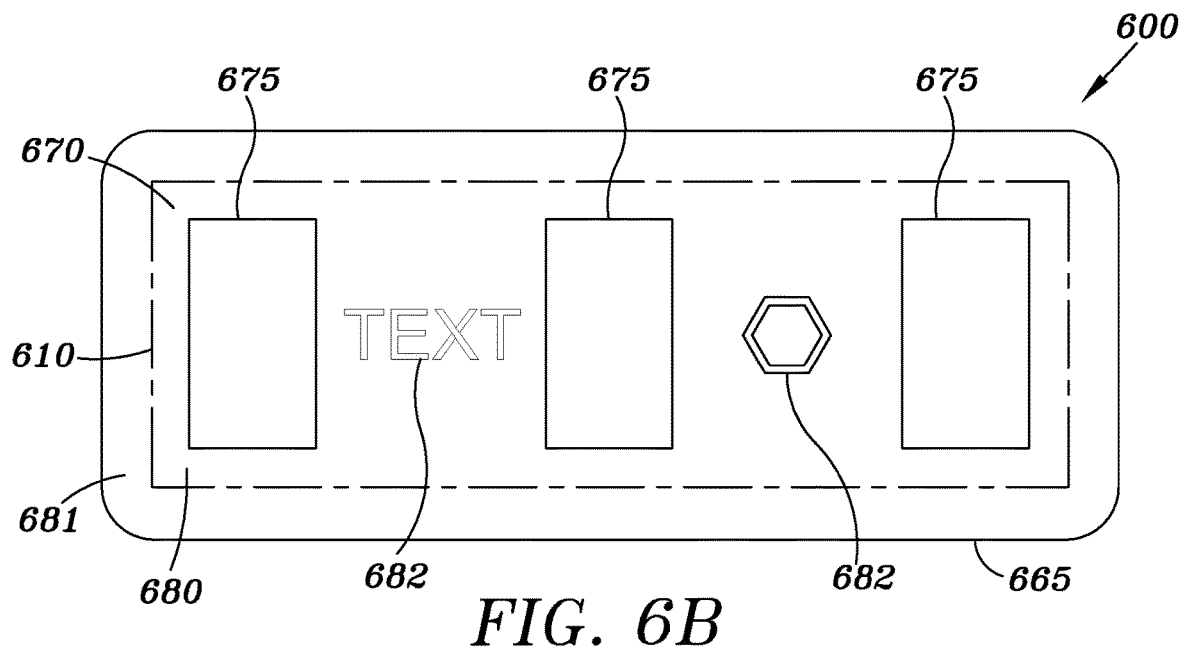
FIG. 6B displays a front view of a sixth embodiment of visual and tactile components of an electronic computing device having backlit graphics.

FIG. 6A displays a perspective view of a sixth embodiment 600 of visual and tactile components of an electronic computing device 105 having backlit graphics 682. Similar to the first embodiment 100, this embodiment 600 includes a touchscreen module 610, a plurality of displays 620, a glass substrate layer 650, a flexible circuit tail (of the touchscreen module 610) 655, a flexible circuit tail (of the plurality of displays 620) 660, a top surface 665, an interactive section 670, a viewable screen section 675, a non-viewable section 680, and a non-interactive section 681. It is noted that the similar reference numbers refer to elements similar to those found in first embodiment 100. Sixth embodiment 600, similar to fifth embodiment 500, may also comprise printed graphics 682 in the form of text and shapes. Graphics 682 may be imprinted (with a semi-transparent paint) or etched onto top surface 665 or onto the bottom surface of glass substrate layer 650 (see FIG. 6B). Light sources 684 may be positioned behind graphics 682 on touchscreen module 610 and adjacent the plurality of displays 620 (see FIG. 6A). In an embodiment where the glass substrate layer 650 is back printed with another color, the printing/etching process may either leave room for the graphics 682 to be printed, the graphics 682 and the other back printing color may be printed onto the glass substrate layer 650 at the same time, or the etching process may take place after the glass substrate layer 650 is already completely back printed with another color. In embodiments, light sources 684 may include, but are not limited to, LEDs, electro-luminescence devices, optical fibers, and incandescent light devices.

FIGS. 7A and 7B display perspective and front views of a seventh embodiment 700 of visual and tactile components of an electronic computing device 105 having a non planar surface. Similar to the first embodiment 100, this embodiment 700 includes a touchscreen module 710, a plurality of displays 720, a glass substrate layer 750, a flexible circuit tail (of the touchscreen module 710) 755, a flexible circuit tail (of the plurality of displays 720) 760, a top surface 765, an interactive section 770, a viewable screen section 775, a non-viewable section 780, and a non-interactive section 782. It is noted that the similar reference numbers refer to elements similar to those found in first embodiment 100. Seventh embodiment 700 may include a non planar touchscreen module 710 and glass substrate layer 750 having a raised configuration. As shown, the plurality of displays 720 are shown inset (within pocketed areas) in relation to the touchscreen module 710 and glass substrate layer 750. This configuration may provide a more defined separability of each of the plurality of displays 720. As shown in FIG. 7B, interactive section 770 may comprise not only the displays 720, but may also include raised portions of the touchscreen module 710 and glass substrate layer 750. In this case, input in the form of a gesture may be carried from one display 720 across the non-viewable section 780 to an adjacent display 720 (similar to other embodiments). In embodiments, the non planar touch surface of electronic computing device may comprise characteristics such as, but not limited to, texture, sweeping curves, pocketed areas, and raised protrusions. Characteristics such as these may be aesthetically pleasing but may additionally enhance the experience of certain programs/applications run by electronic computing device 105 such as, but not limited to, video games.

FIG. 7C displays a cross-sectional view of the seventh embodiment 700 of visual and tactile components of an electronic computing device 105 having a non planar surface. Touchscreen module 710 is shown including an inset area as well as a raised area so that tactile functionality is not lost at any portion of the electronic computing device 105, including any angled portions of touchscreen module 710. Glass substrate layer 750 is inset within touchscreen module 710 so that glass substrate layer 750 sits flush with touchscreen module 710 and creates a flush top surface 765. In certain embodiments, touchscreen module 710 may only include portions of the seventh embodiment 700 that are planar in relation to the structure of the seventh embodiment 700 as a whole. For example, at least one of the glass substrate layers 750 and the physical construct defining top surface 765 may define touchscreen module 710.

Figure 8A:
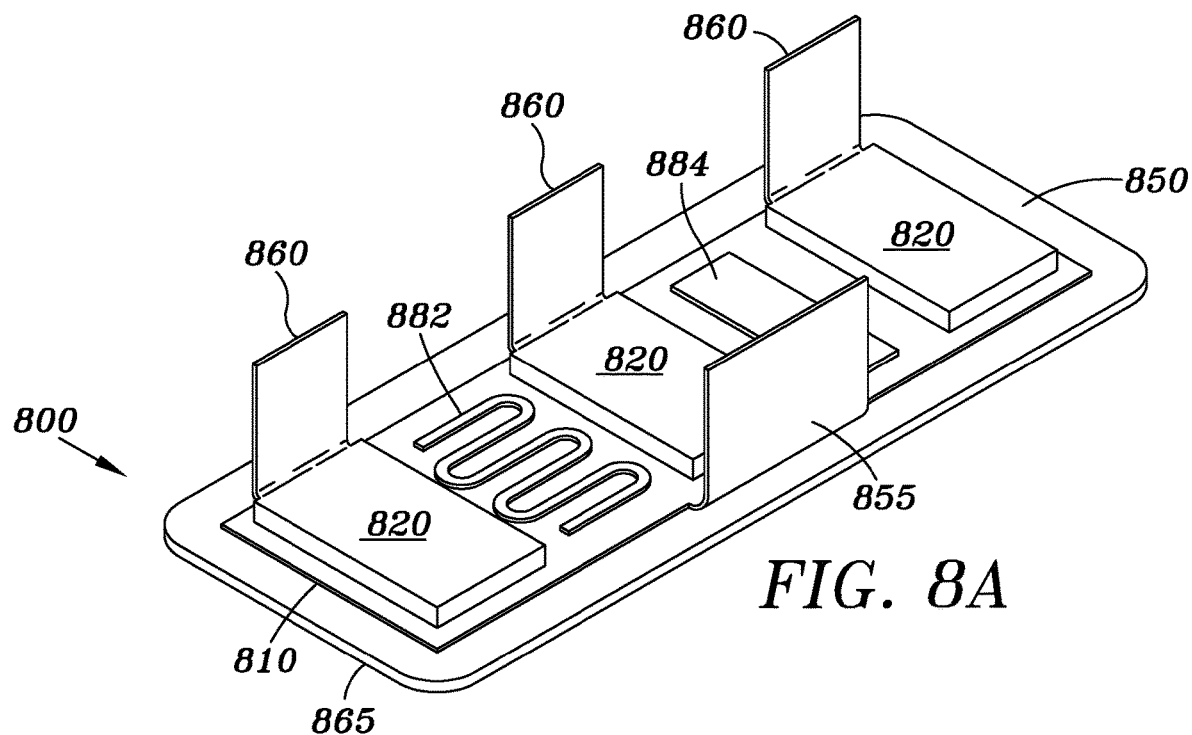
FIG. 8A displays a perspective view of an eighth embodiment of visual and tactile components of an electronic computing device having antennas.
Figure 8B:
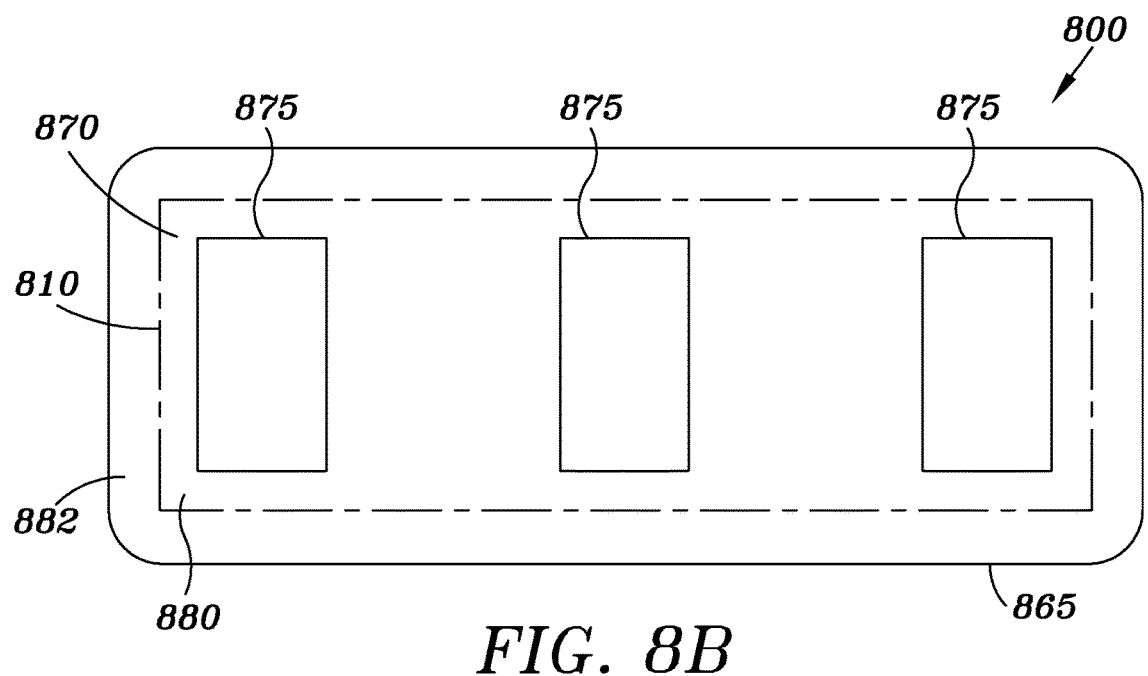
FIG. 8B displays a front view of an eighth embodiment of visual and tactile components of an electronic computing device having antennas.

FIG. 8A displays a perspective view of an eighth embodiment 800 of visual and tactile components of an electronic computing device 105 having antennas 882,884. Similar to the first embodiment 100, this embodiment 800 includes a touchscreen module 810, a plurality of displays 820, a glass substrate layer 850, a flexible circuit tail (of the touchscreen module 810) 855, a flexible circuit tail (of the plurality of displays 820) 860, a top surface 865, an interactive section 870, a viewable screen section 875, a non-viewable section 880, and a non-interactive section 882. It is noted that the similar reference numbers refer to elements similar to those found in first embodiment 100. Similar to other embodiments, the eighth embodiment 800 comprises spaced-out displays 820. The space between displays 820 may be utilized for positioning one or more antennas 882,884 and may include one or more configurations of antennas 882, 884. Antennas 882,884 may be used to transmit or receive signals in one or more networks that utilize radio waves. As shown in FIG. 8A, antennas 882,884 may be positioned between displays 820 in order to not overlap the viewable screen sections 875 or interfere with them. It is noted that antennas 882,884 are not viewable through touchscreen module 810 and glass substrate layer 850 and are considered internal components of electronic computing device 105 (see FIG. 8B).

Figure 9A:
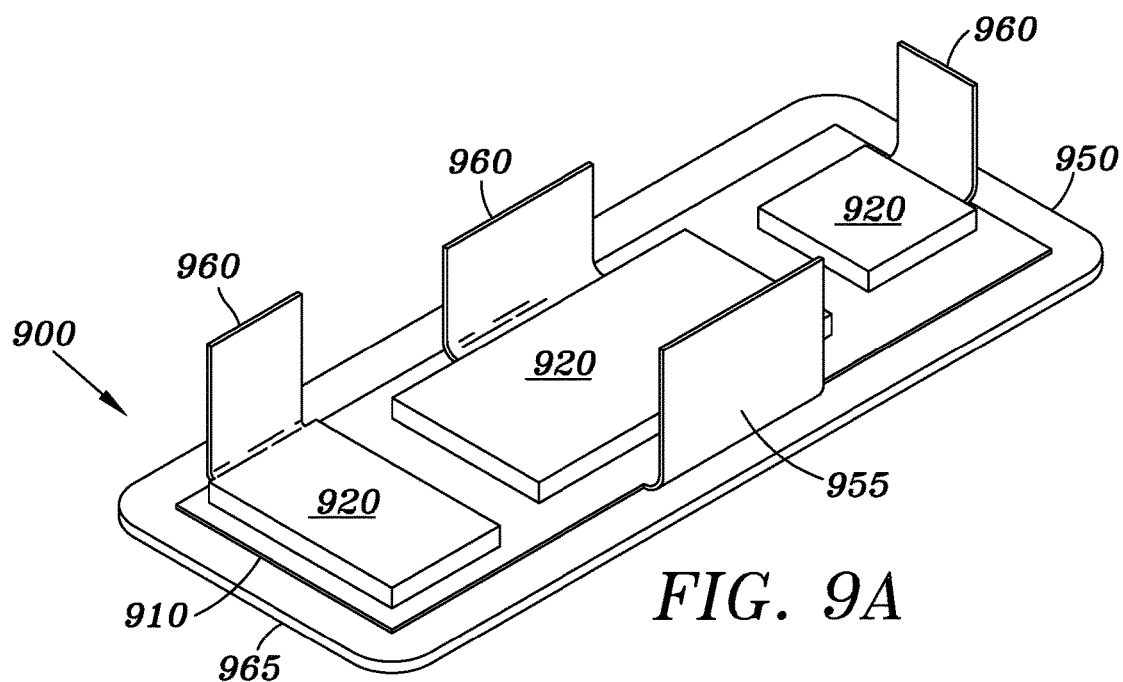
FIG. 9A displays a perspective view of a ninth embodiment of visual and tactile components of an electronic computing device having a plurality of different sized and shaped viewable screen sections.
Figure 9B:
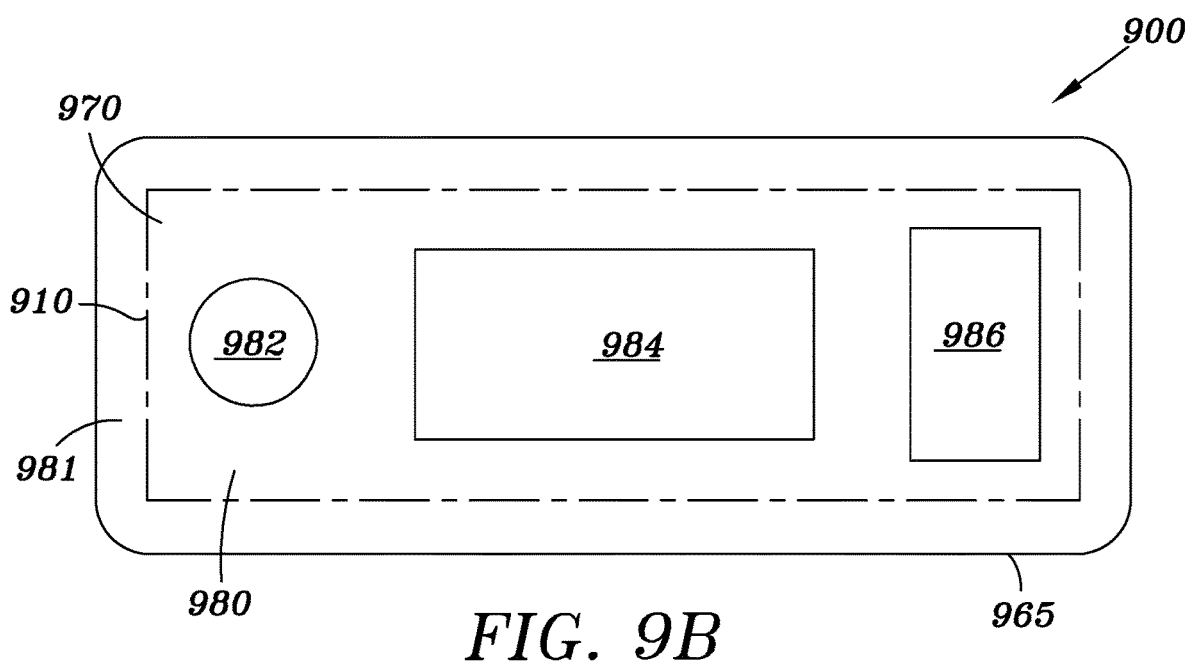
FIG. 9B displays a front view of a ninth embodiment of visual and tactile components of an electronic computing device having a plurality of different sized and shaped viewable screen sections.

FIG. 9A displays a perspective view of a ninth embodiment 900 of visual and tactile components of an electronic computing device 105 having a plurality of different sized and shaped viewable screen sections. Similar to the first embodiment 100, this embodiment 900 includes a touchscreen module 910, a plurality of displays 920, a glass substrate layer 950, a flexible circuit tail (of the touchscreen module 910) 955, a flexible circuit tail (of the plurality of displays 920) 960, a top surface 965, an interactive section 970, a viewable screen section 975, a non-viewable section 980, and a non-interactive section 981. It is noted that the similar reference numbers refer to elements similar to those found in first embodiment 100. Ninth embodiment 900 may comprise displays 920 of multiple sizes and shapes. The size and shape of each of the displays 920 may correlate with what type of programs/applications each of the displays 920 are expected to run. For example, if one of the displays 920 needs to display a digital keyboard, the display 920 that may be used to run and display the digital keyboard may be shaped or sized as similarly as possible to the output of the digital keyboard. As shown in FIG. 9B, portions of viewable screen section 975 may comprise a specific size and/or shape. These shapes and sizes of the viewable screen section 975 may correlate with the sizes and shapes of screens (not depicted) found on the displays 920 in order to provide an optimal visual output for a user. These sizes and shapes of viewable screen section 975 may be formed by back painting the glass substrate layer 950 in the desired size and shape so that only portions of the display not overlapped by painted glass substrate layer 950 may be viewable in viewable screen section 975.

Figure 10A:
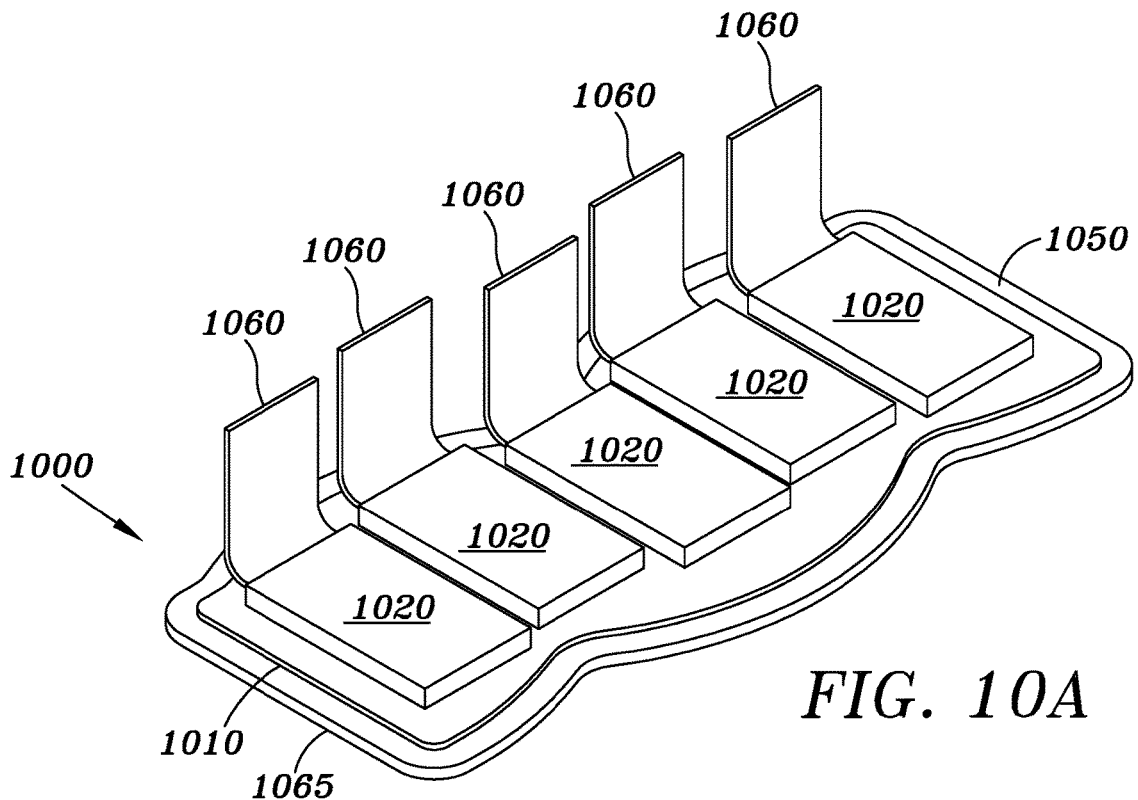
FIG. 10A displays a perspective view of a tenth embodiment of visual and tactile components of an electronic computing device having a nonlinear pattern of displays.
Figure 10B:
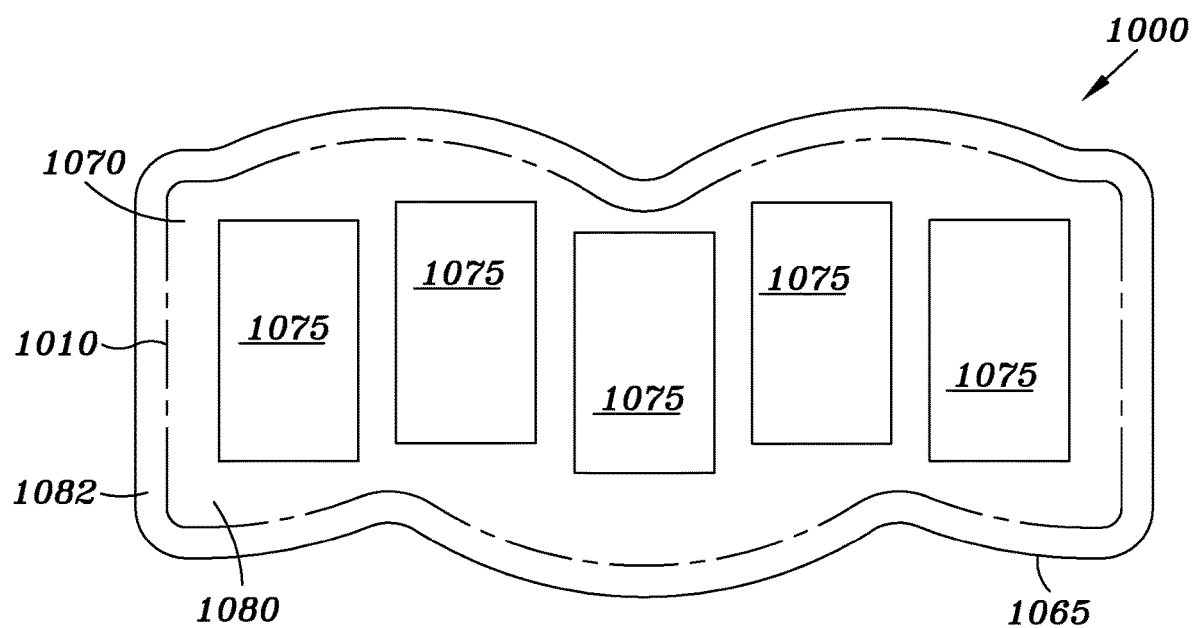
FIG. 10B displays a front view of a tenth embodiment of visual and tactile components of an electronic computing device having a nonlinear pattern of displays.

FIG. 10A displays a perspective view of a tenth embodiment 1000 of visual and tactile components of an electronic computing device 105 having a nonlinear pattern of displays 1020 in accordance with embodiments. Similar to the first embodiment 100, this embodiment 1000 includes a touchscreen module 1010, a plurality of displays 1020, a glass substrate layer 1050, a flexible circuit tail (of the touchscreen module 1010) 1055, a flexible circuit tail (of the plurality of displays 1020) 1060, a top surface 1065, an interactive section 1070, a viewable screen section 1075, a non-viewable section 1080, and a non-interactive section 1082. It is noted that the similar reference numbers refer to elements similar to those found in first embodiment 100. Tenth embodiment 1000 includes a glass substrate layer 1050 and a touchscreen module 1010 each having a similar non-rectangular shape. Within this configuration, the plurality of displays 1020, and therefore the viewable screen sections 1075 (see FIG. 10B), are positioned in a random configuration. Placing the plurality of displays 1020 in a random/specific configuration may be utilized when there is a specific relationship between programs/applications being displayed by the plurality of displays 1020. For example, electronic computing device 105 may display screens representative of a program/application for an eye exam measuring an eye response rate, an individual may need to follow a random pattern of objects, colors etc. in order to complete the eye exam. Since the displays 1020 can be randomly arranged, this program/application may properly function on electronic computing device 105. It is noted that displays 1020 may comprise a standard shape, such as a rectangle, while at least one of the touchscreen modules 1010 and the glass substrate layer 1050 may comprise a random or uncommon shape (such as that shown in FIGS. 10A and 10B).

In embodiments, at least a portion of at least one of the plurality of displays 1020 may comprise a shape substantially similar to a non-rectangular shape of either touchscreen module 1010 or glass substrate layer 1050.

Figure 11A:
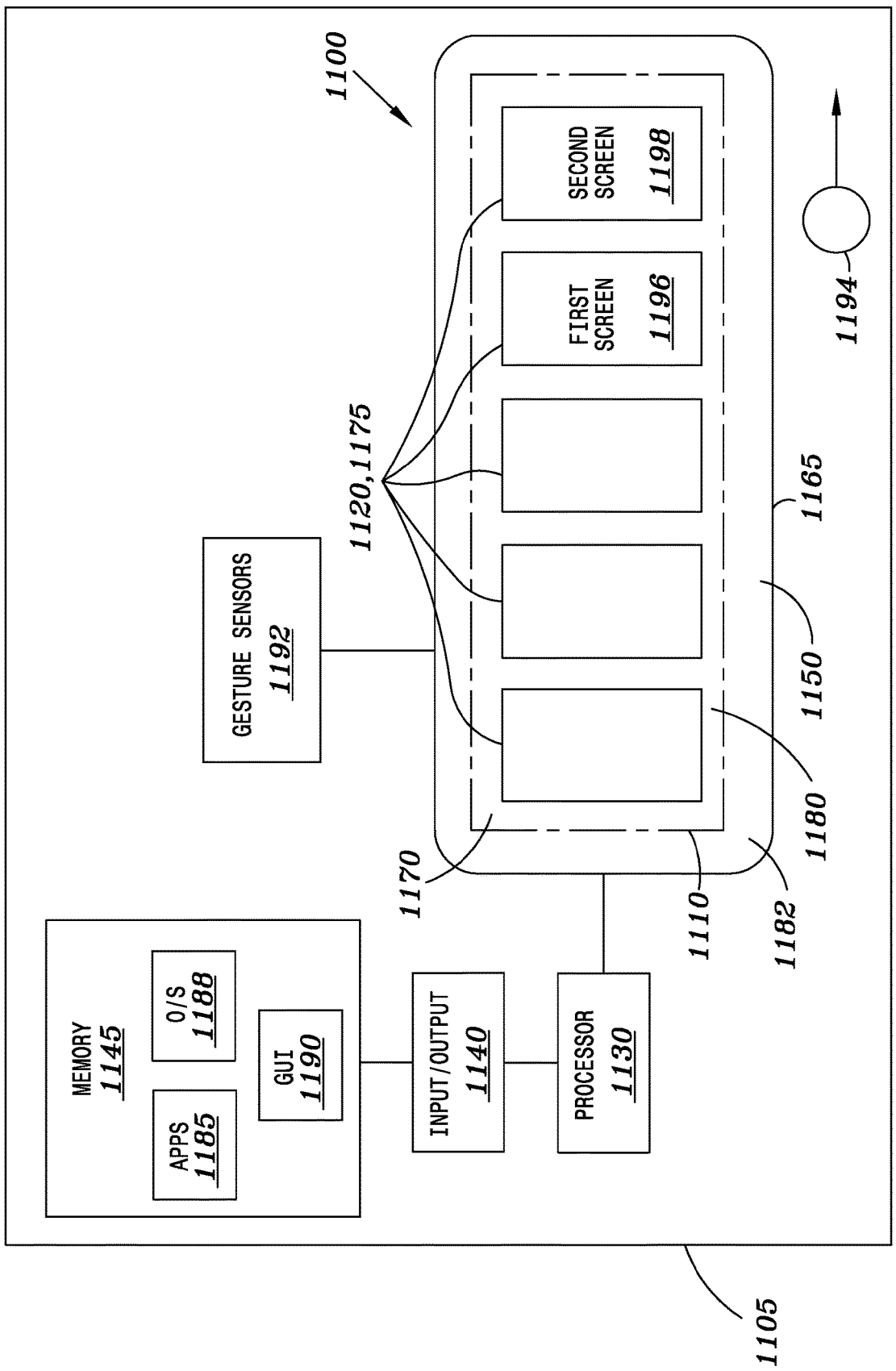
FIG. 11A displays a first view of an electronic computing device receiving a gesture input in accordance with embodiments.

FIG. 11A displays a first view of an electronic computing device 1105 receiving a gesture input 1194 in accordance with embodiments. Similar to the first embodiment 100, electronic computing device 1105 includes a touchscreen module 1110, a plurality of displays 1120, a glass substrate layer 1150, an interactive section 1170, a viewable screen section 1175, a non-viewable section 1180, and a non-interactive section 1182. It is noted that the similar reference numbers refer to elements similar to those found in first embodiment 100. Electronic computing device 1105 includes components memory 1145, processor 1130, input/output 1140, and interactive module 1100. Memory 1145 may store apps 1185, O/S 1188, and GUI. These elements stored on memory 1145 may be sent through input/output 1140 to be processed by processor 1130 so that apps 1185, O/S 1188, and/or GUI 1190 may be run on interactive module 1100. When apps 1185 is run on interactive module 1100, a first screen 1196 may be displayed on one of the plurality of screens 1120. A second screen 1198 may also be displayed on another of the plurality of screens 1120 when apps 1185 is run on interactive module 1100.

If a user of the electronic computing device 1105 wants to move first screen 1196 to the position of the second screen 1198, the user may perform a gesture input, denoted as 1194

Figure 11B:
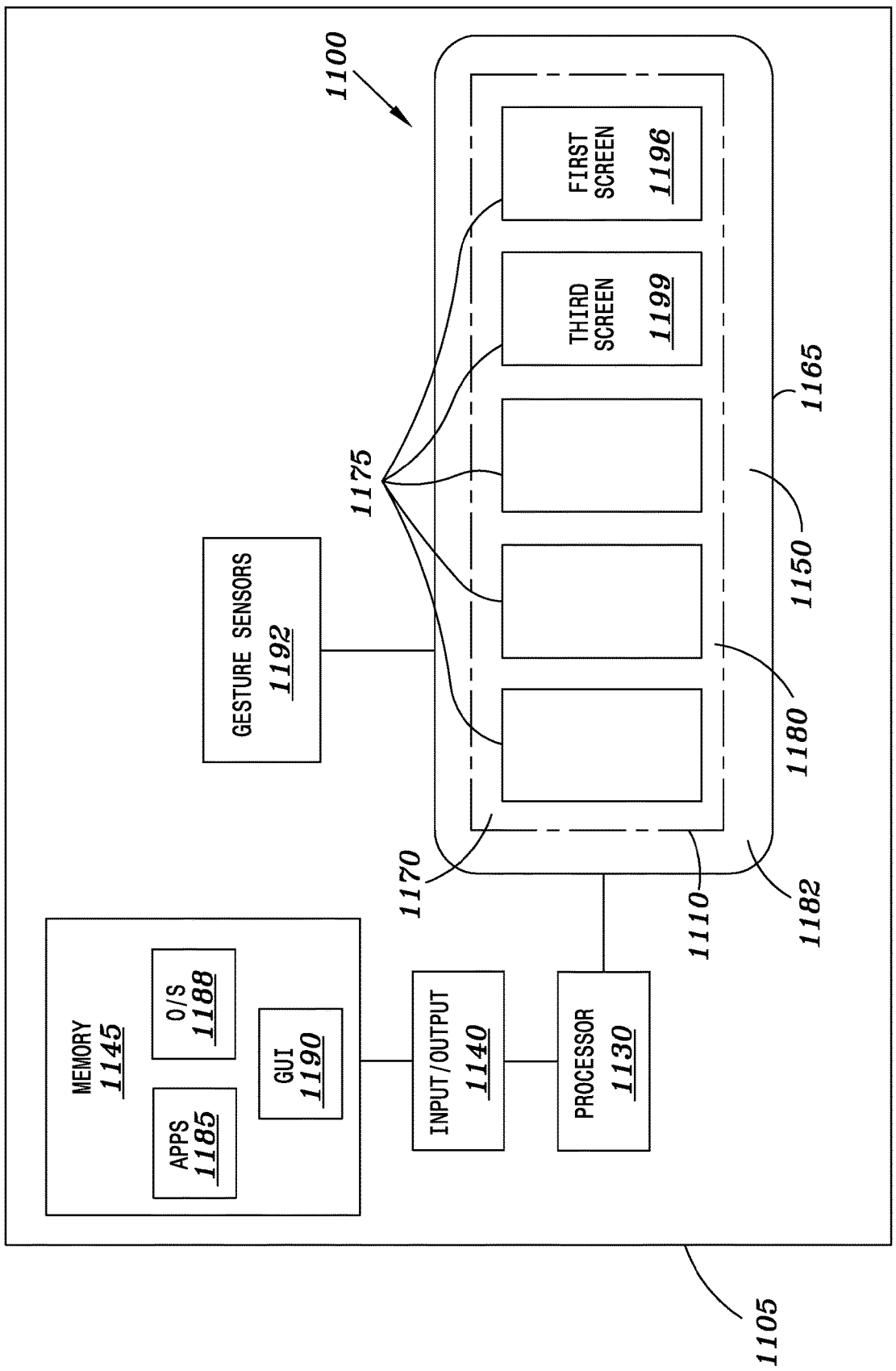
FIG. 11B displays a second view of an electronic computing device responding to a gesture input in accordance with embodiments.

(with the circle representing a touch of a finger of the user and the arrow representing a swipe of a finger of the user). The user may begin the gesture input 1194 by engaging first screen 1196 with one or more fingers, sliding the fingers on the interactive section 1170 across non-viewable section 1180, and stopping the sliding of the fingers when the fingers are positioned over a second display 1120 displaying second screen 1198. During this process, gesture sensors 1192 in operable communication with processor 1130, are operable to receive, analyze, and translate the gesture input 1194 as an input used to move a first element associated with a first display 1120 (first screen 1196) to a second position in a second display 1120, while also replacing a second element in the second display 1120 (second screen 1198) with the first element (first screen 1196). FIG. 11B shows the result of the gesture input 1194 being processed and accepted as an acceptable function of interactive module 1100. As a result of the gesture input 1194, first screen 1196 is positioned where second screen 1198 is positioned in FIG. 11A and a third screen 1199 in FIG. 11B (may display elements or may be blank) is positioned where the first screen 1196 is positioned in FIG. 11A.

In embodiments, other forms of gesture input 1194 may be utilized to carry out additional functions that may manipulate interactive elements displayed on the displays of interactive module 1100. It is noted that any form of a gesture input 1194 may be read and analyzed by gesture sensors 1192 when the gesture input 1194 acts upon either viewable screen section 1175 or non-viewable section 1180. In additional embodiments, first screen 1196 (more generally, any screen) may be moved from one display 1120 to another display 1120 across an area of touchscreen module 1110/interactive section 1170 using at least a portion of a gesture input 1194 by a user without the individual having to physically touch any portion of the other display 1120. If, in this instance, any portion of first screen 1196 is readable and/or positioned within the other display 1120 while a portion of the gesture input has already occurred, the other display 1120 may detect the portion of first screen 1196 and automatically capture the entirety of the first screen 1196 and display first screen 1196 on the other display 1120 (so that the user does not have to finish the gesture input 1194 and can lift their finger away from touchscreen module 1110/interactive section 1170 before their finger physically touches the other display 1120).

In embodiments, a first screen 1196 (more generally, any screen) positioned on a display 1120 may comprise a first shape that correlates with a specifically shaped first viewable screen section 1175 overlapping the display 1120. When first screen 1196 is moved to and positioned on another display 1120, first screen 1196 may comprise a second shape that correlates with a specifically shaped second viewable screen section 1175 overlapping the other display 1120. In other embodiments, first screen 1196 may comprise a shape that correlates with either the specifically shaped first viewable screen section 1175 or the specifically shaped second viewable screen section 1175. For example, if the specifically shaped first viewable screen section 1175 is shaped like a circle, first screen 1196 may be shaped like a circle when first screen 1196 is positioned on display 1120. But when first screen 1196 is moved and positioned on the other display 1120 (that is shaped like a rectangle), first display 1196 may be shaped like a rectangle. In further embodiments, first screen 1196 may take up only a portion of space in a first viewable screen section 1175 overlapping a display 1120 and may also take up only a portion of space in a second viewable screen section 1175 overlapping the other display 1120. In additional embodiments, first screen 1196 may take up only a portion of space in either first viewable screen section 1175 or second viewable screen section 1175.

In embodiments, various attachment and fitting techniques and equipment (male-female engagement, fastening means, adhesives) may be utilized in any of the disclosed embodiments in order for components of the embodiments to efficiently and/or properly attach to one another and so that electronic computing devices 105,1105 can efficiently and/or properly function.

In embodiments, a screen (see multiple FIGS.) may be presented on multiple displays (see multiple FIGS.) within viewable screen sections (see multiple FIGS.) on electronic computing devices 105,1105. For example, a single screen may be displayed across and only within viewable screen sections so that there is no portion of the screen obstructed by a non-viewable section (see multiple FIGS.). In further embodiments, a screen may be at least partially presented on multiple displays within viewable screen sections on electronic computing devices 105,1105. For example, a single screen may be displayed across and within separated viewable screen sections and the portions of the screen that are obstructed by non-viewable section are not viewable (so that not all of the screen is viewable); it is noted that all portions of the screen are positioned within interactive section (see multiple FIGS.) so that all portions of the screen may be able to be interacted with (just not seen all at once).

It is noted that multiple embodiments of electronic computing device 105 may be utilized in specific settings. As an example, embodiments of electronic computing device 105 may be utilized as a handheld user electronic device. As another example, embodiments of electronic computing device 105 may be utilized in an environment that requires the electronic computing device to monitor multiple aspects of a much larger system, such as in an aircraft cabin environment. If electronic computing device 105 is utilized in a specific setting or for a specific purpose, electronic computing device 105 may, in embodiments, not include a casing and may instead be incorporated into a structure, such as, but not limited to, a wall. This scenario, for example, may occur within an aircraft cabin environment. The electronic computing device 105 may not be mobile, but may have a stationary location on an inner wall of the aircraft that is easily accessible to flight attendants.

In embodiments, at least one of touchscreen module 110 and glass substrate layer 150 may comprise materials other than glass and may include one or more polymers such as, but not limited to polycarbonate, acrylic, nylon, polyolefin, cyclic olefin, polyamide, polyvinyl alcohol, polypropylene, polystyrene, COC (topas resin), polyimide, polyethylene, polyethylene terephthalate, polyvinyl chloride, COP (zeonor resin), and polysulfone. It is noted that, in embodiments, the one or more polymers are transparent in order to optimally display content from electronic computing device 105.

For the purposes of this disclosure, the terms "plurality of displays" and "displays" may be synonymous.

For the purposes of this disclosure, the terms "touchscreen electronic device", "electronic computing device", "touchscreen device", "electronic device", "computing device", and "device" may be synonymous.

Unless otherwise defined, all technical and scientific terms used herein have the same meanings as are commonly understood by one of ordinary skill in the art to which this disclosure belongs. Although methods similar or equivalent to those described herein can be used in the practice or testing of the present disclosure, suitable methods are described herein.

All publications, patent applications, patents, and other references mentioned herein are incorporated by reference in their entirety. In case of conflict, the patent specification, including definitions, will prevail. In addition, the materials, methods, and examples are illustrative only and not intended to be limiting.

It will be appreciated by persons skilled in the art that the present disclosure is not limited to what has been particularly shown and described hereinabove. Rather, the scope of the present disclosure is defined by the appended claims and includes both combinations and sub-combinations of the various features described hereinabove as well as variations and modifications thereof, which would occur to persons skilled in the art upon reading the foregoing description.

I claim:

1. An electronic computing device, comprising:
a casing;
a processor;
a graphical user interface stored on the processor;
a glass substrate layer bound by a perimeter of the casing, the glass substrate layer defining a top surface of the electronic computing device;
a single touchscreen module in operable communication with the processor, the single touchscreen module positioned adjacent the glass substrate layer;
and
a plurality of displays integrated with the single touchscreen module and in operable communication with the processor, each of the plurality of displays operable to display a screen;
wherein each of the plurality of displays are positioned directly adjacent a defined area of the single touchscreen module and wherein the plurality of displays defines a plurality of viewable screen sections;
an interactive section for permitting user input, the interactive section bound by the perimeter of the single touchscreen module, wherein the interactive section overlaps and contains the plurality of viewable screen sections.

2. The device of claim 1, wherein the interactive section bounding the plurality of viewable screen sections comprises a raised configuration.

3. An electronic computing device, comprising:
a casing defining dimensions of the electronic computing device;
a processor for executing processing instructions received by one or more interior components of the electronic computing device;
a graphical user interface stored on the processor;
a glass substrate layer bound by a perimeter of the casing and defining a top surface of the electronic computing device, the glass substrate layer and casing enclosing the interior components of the electronic computing device;
a single touchscreen module in operable communication with the processor, the single touchscreen module positioned directly adjacent and in direct communication with the glass substrate layer;
a plurality of displays integrated with and positioned adjacent a defined area of the single touchscreen module and in operable communication with the processor, each of the plurality of displays operable to display a screen;
an interactive section for permitting user input and defined by a perimeter of the single touchscreen module;
and
a plurality of viewable screen sections defined by the plurality of displays;
wherein the interactive section overlaps and contains the plurality of viewable screen sections.

4. An electronic computing device, comprising:
a casing;
a processor;
a graphical user interface stored, on the processor;
a glass substrate layer bound by a perimeter of the casing, the glass substrate layer defining a top surface of the electronic computing device;
a single touchscreen module in operable communication with the processor, the single touchscreen module positioned adjacent the glass substrate layer, the single touchscreen module comprising a plurality of gesture sensors in operable communication with the processor, the plurality of gesture sensors operable to receive and analyze at least one gesture input;
a plurality of displays integrated with the single touchscreen module and in operable communication with the processor, each of the plurality of displays positioned adjacent a defined area of the single touchscreen module and operable to display a screen;
and
a non-viewable section bordering each of the plurality of displays and defined by a perimeter of the single touchscreen module and perimeters of each of the plurality of displays;
wherein the screen is translatable across the non-viewable section from a first display of the plurality of displays to a second display of the plurality of displays via one of the at least one gesture input performed uninterrupted from the first display, across the non-viewable section, to the second display, the performing of the at least one vesture input being performed along a continuous surface of the glass substrate layer.

* * * * *